(12) United States Patent
Bangle et al.

(10) Patent No.: US 7,150,494 B2
(45) Date of Patent: Dec. 19, 2006

(54) FLAT SECTION OF THE OUTER SKIN OF THE BODYWORK OF A MOTOR VEHICLE

(75) Inventors: Christopher Bangle, Gilching (DE); Klaudia Kruse, Munich (DE); Fernando Pardo, Moorpark, CA (US); Christine Schwarz, Munich (DE); Verena Weiss, Munich (DE); Reinhard Mehn, Haimhausen (DE); Christian Bischoff, Gilching (DE); Sven Lancier, Munich (DE); Anders Warming, Malibu, CA (US); Juergen Ringer, Au in der Hallertau (DE); Werner Haumayr, Munich (DE); Helmut Pulz, Erding (DE); Alfred Neureiter, Karlsfeld (DE); Silke Schroeder, Freising (DE); Martin Meusel, Munich (DE); Mario Greco, Munich (DE); Edwin Pistorius, Olching (DE); Raphael Von Schuttenbach, Ingolstadt (DE); Andreas Von Schuttenbach, Ingolstadt (DE); Peter Ratz, Herrsching (DE); Bjoern Koop, Starnberg (DE); Detlef Helm, Hilgertshausen (DE); Bernd Nurtsch, Gars (DE); Daniel Schaefer, Olching (DE); John Krieger, Oxnard, CA (US); Michael Scully, Calabasas, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 37 days.

(21) Appl. No.: 10/601,306

(22) Filed: Jun. 23, 2003
(Under 37 CFR 1.47)

(65) Prior Publication Data
US 2004/0130182 A1    Jul. 8, 2004

Related U.S. Application Data

(63) Continuation of application No. PCT/EP01/15203, filed on Dec. 21, 2001.

(30) Foreign Application Priority Data

| Dec. 23, 2000 | (DE) | ................. 100 64 931 |
| Mar. 23, 2001 | (DE) | ................. 101 14 276 |
| Jul. 27, 2001 | (DE) | ................. 101 36 822 |
| Nov. 28, 2001 | (DE) | ................. 101 58 364 |

(51) Int. Cl.
*B62D 35/00* (2006.01)
(52) U.S. Cl. ................................. 296/180.5
(58) Field of Classification Search ............ 296/180.1, 296/180.2, 180.3, 180.4, 180.5; 180/903; 188/2 R; 276/100.11, 100.12, 100.13, 100.15, 276/100.17, 100.18, 107.01, 107.09, 107.12, 276/107.15
See application file for complete search history.

(56) References Cited

U.S. PATENT DOCUMENTS

| 4,684,419 A | * | 8/1987 | Agosta ........................ 156/93 |
| 4,770,457 A | | 9/1988 | Tomforde |
| 5,016,936 A | * | 5/1991 | Goodrich .................... 296/39.3 |
| 5,106,145 A | * | 4/1992 | Corder .................... 296/107.12 |
| 5,147,713 A | * | 9/1992 | Dalbec et al. .............. 442/164 |
| 5,267,771 A | | 12/1993 | Rothe |
| 5,324,577 A | * | 6/1994 | Dalbec et al. .............. 442/155 |
| 5,733,620 A | | 3/1998 | Baader et al. |
| 5,923,245 A | | 7/1999 | Klatt et al. |
| 6,276,120 B1 | * | 8/2001 | Adriaensen et al. .......... 57/210 |
| 6,309,009 B1 | | 10/2001 | Blochl et al. |
| 6,323,144 B1 | * | 11/2001 | Dalbec ........................ 442/120 |
| 6,378,932 B1 | * | 4/2002 | Fasel et al. ............. 296/180.5 |
| 6,398,287 B1 | * | 6/2002 | Smith et al. ........... 296/100.01 |
| 2003/0116996 A1 | * | 6/2003 | Soja et al. ................ 296/180.5 |
| 2004/0119319 A1 | * | 6/2004 | Reiman et al. .......... 296/180.1 |
| 2004/0155485 A1 | * | 8/2004 | Hamnett .................. 296/180.1 |
| 2005/0112976 A1 | * | 5/2005 | McMurray et al. ......... 442/306 |

FOREIGN PATENT DOCUMENTS

| DE | 003619959 A1 | * | 12/1987 | ............. 296/180.3 |
| DE | 003622663 A1 | * | 1/1988 | ............. 293/180.3 |

| DE | 19621030 A1 | 11/1997 |
| --- | --- | --- |
| DE | 19712648 A1 | 10/1998 |
| DE | 19942061 A1 | 3/2000 |
| DE | 19912140 A1 | 9/2000 |
| DE | 10026264 A1 | 11/2001 |
| WO | WO 95/31355 | 11/1995 |

OTHER PUBLICATIONS

Copy of international search report from PCT/EP01/15203.

\* cited by examiner

*Primary Examiner*—H Gutman
(74) *Attorney, Agent, or Firm*—Crowell & Moring LLP

(57) ABSTRACT

An at least partially moveable motor-vehicle outer skin is already known per se. An actuator formed of a polymer and/or ion-exchanging and/or other material exhibiting various conformations is provided so that the outer skin can be moved. This material is moveable as a result of physical or chemical effects. The novel outer skin of a motor vehicle requires no expensive tools for the production thereof. The flat section of the outer skin of the bodywork of a motor vehicle is made of a flexible material. A flexible material such as material for convertible top covers is easily moveable yet the surface thereof cannot be increased. This material is tensed at least over one part of the rib of the motor vehicle, e.g. over a space frame. At least one mechanically moveable adjusting element is provided beneath or on top of the edge of the section enabling the outer skin to be deformed. The adjusting element is normally connected to the rib of the motor vehicle.

55 Claims, 16 Drawing Sheets

FLAT SECTION OF THE OUTER SKIN OF THE BODYWORK OF A MOTOR VEHICLE

This is a continuation of International Application PCT/EP01/15203 with an international filing date of Dec. 21, 2001, the disclosure of which is incorporated by reference herein.

This application also claims the priorities of prior applications 100 64 931.9, filed in Germany on Dec. 23, 2000, 101 14 276.5, filed in Germany on Mar. 23, 2001, 101 36 822.4, filed in Germany on Jul. 27, 2001, and 101 58 364.8, filed in Germany on Nov. 28, 2001.

BACKGROUND AND SUMMARY OF THE INVENTION

The invention relates to a section of a body of a vehicle including a flexible material outer skin that is tensed at least over one part of a frame of the vehicle. The invention also relates to a process of changing a configuration of such a flat section.

An at least partially movable outer skin of a motor vehicle is known from German patent application DE 100 26 264.3. To be able to move this outer skin, an actuator consisting of a polymer and/or ion-exchanging material and/or a material exhibiting various conformations is provided. This material is movable as a result of physical or chemical effects.

It is an object of this invention to create an outer skin of a motor vehicle body in which the tooling costs required for manufacture are very low.

This object is achieved by providing at least one mechanically moveable adjusting element provided beneath or on an edge of the outer skin so as to enable the outer skin to be deformed.

A flat section of an outer skin of a motor vehicle body consists of flexible material. A flexible material, such as a material for a convertible top cover, can be moved easily, but its surface cannot be increased. This material is tensed at least over a portion of a motor vehicle frame, for example a space frame. Pursuant to the invention, at least one mechanically movable adjusting element is provided beneath or on the edge of the section, enabling the outer skin to be deformed. The adjusting element is normally connected with the vehicle frame. The outer skin, for example, can be tensed by a bow, which can be displaced in a linear fashion.

By replacing classic outer skin parts made of sheet metal with a flexible outer skin, expensive sheet metal forming tools are no longer required. The weight of the outer skin is reduced considerably because flexible materials, such as cloth tissues, have a considerably lower weight than corresponding sheet metal components. The tight design limits for outer skin parts made of sheet metal with regard to package as well as regarding a formal integration of additional functions also no longer apply to the invented flexible outer skin parts. Through the possibility of active deformation of the outer skin, movable outer skin parts that so far used to be separate can also be integrated now. Due to this integration, gaps and/or joints, which are undesirable for visual appearance and usually require a lot of sealing efforts in order to avoid corrosion, do not arise any more with a single outer skin component. Furthermore, fast and inexpensive repairs are possible, because not all the various outer skin parts must be kept in inventory; instead, only a single roll of the flexible material is sufficient for all the different outer skin parts. The actual replacement is also simple in the case of an outer skin made of flexible material, and can thus be done quickly and is less cost intensive.

Beneficially, the flexible material has elastic properties, i.e. the surface of the material can be enlarged. Typical flexible materials with elastic properties are, among other things, stretch materials, latex, and all elastomers. A flexible and elastic outer skin of a motor vehicle body enables the molded design to be even more free than an outer skin that is only flexible.

Ideally, the elastic section of the outer skin can absorb impact forces during an accident. This represents a very simple, inexpensive and elegant possibility for achieving so-called pedestrian impact protection. With a skilled design, no separate components are required any longer. The vehicle passengers can also be protected during a crash when the outer skin of the body has energy-absorbing characteristics.

On one edge of the section, a strip is beneficially attached, which strip can be fastened to a component that is firmly attached to the body through a clip connection. The strip can, for example, be glued to the edge of the section, be welded to it or, pursuant to a particularly suitable further development, be sewed onto the edge of the section. For this purpose, the strip is favorably made of plastic. A sewing needle, for example of an industrial sewing machine, can effortlessly penetrate a strip that is made of a thermoplastic and not too thick. The clip connection of the strip with the component that is attached to the body can be designed such that the attached component represents a type of rod onto which the strip can be clipped with a clip section that contains a channel with a C-shaped cross-section. This clip section then encloses the rod in the clipped-on section in a form-fit manner, at least in part.

High forces can act upon such a clip connection, in particular with the use of a pre-tensioned section with elastic properties. In order to lower these forces acting upon the clip connection, the section can be tensioned in the vicinity of the clip connection in the direction of the force across a portion of the vehicle frame or through an adjustment element in such a way that frictional forces occur in the contact regions between the vehicle frame and/or the adjusting element and the section. The forces that are applied onto the clip connection are hereby reduced roughly by the occurring frictional forces.

At least one adjustment element can beneficially be moved in a translatory and/or rotatory fashion. For example, pneumatic, electric, piezo-electric or hydraulic adjusting elements are available as standard components for translatory and rotatory movements. Through the combination of several of these standard adjusting elements, any motion-related kinematics can be achieved without requiring a complex special design for the adjusting element. Alternatively, adjusting elements that are moved solely by the air flowing around the vehicle while in motion are also possible.

A coupling of the movement of an adjusting element to the vehicle speed is also possible. In particular when the section of the outer skin is important for the aerodynamics of the vehicle, it can be desirable to be able to deform the section as a function of the vehicle speed. In this way, for example, a spoiler only develops its effect at high velocities. At low speeds, such a spoiler, which usually does not contribute positively to the visual beautification of a vehicle, does not necessarily have to be visible.

In a beneficial further development the section can be deformed in the rear area of a vehicle by at least one adjusting element such that it generates an aerodynamic drive similar to a rear spoiler. A spoiler designed in this way can be displaced between a resting position and a usage position.

Pursuant to a favorable embodiment, the adjusting element can be seated eccentrically and/or have an elliptic cross-section so that the outer skin can be deformed in the rear area of the end section of the tailgate in such a way that an aerodynamic drive is created.

Ideally, the adjusting element is swiveled as a function of the respective vehicle speed. Aerodynamic set-ups and designs of the body increase its efficiency considerably with increasing vehicle velocity. At low speeds, such as for example in city traffic, the effect that can be achieved is very low, while particularly at low speed the less appealing appearance is especially visible. Therefore it makes sense to swivel the adjusting element only at higher vehicle speeds. Due to the swivel motion, the required storage space is also lower compared to a translatory motion. In this way the storage space beneath the tailgate is impaired less.

In order to increase the effect further, ideally, two swiveling adjusting elements can also be provided. These two adjusting elements can be arranged next to each other, or the second adjusting element can be arranged on a movable section of a first adjusting element. Depending on the configuration, either a particularly large spoiler or a spoiler with a particularly large travel path can be implemented.

In a favorable embodiment, the spoiler and a surrounding area on the body side is covered with the section made of a flexible and elastic material, which forms the outer skin. A gap is incorporated between the movable spoiler and the surrounding area on the body side. In familiar spoiler arrangements, this gap is very difficult to seal and disrupts the visual appearance. By covering the spoiler and the surrounding area on the body side with the flexible and elastic material neither sealing is required nor is the visual appearance impaired by a visible gap. The flexible and elastic material forms the outer skin and covers the gap so that no water can penetrate into said gap. The surface quality and paint of the body and spoiler parts located beneath this outer skin have to fulfill considerably lower requirements because contrary to familiar body and spoiler parts they do not form the visible outer skin. These parts can therefore be produced with less effort and thus lower cost implications.

Ideally no marginal sections of the spoiler can be made out on the outer skin made of flexible and elastic material, regardless of the position of the spoiler. The drastic difference in height between the spoiler in the used position and the surrounding area on the body side is solved in a visually very appealing way through a continuous transition area on the outer skin, which stretches all the way across. When the spoiler is shifted from its one final position into the other final position, it must be ensured that the flexible and elastic material that stretches across is sufficiently ductile so that it can tolerate this displacement even in the case of larger travel paths and still does not flap.

The spoiler can be both a front and a rear spoiler. It is particularly advantageous with a rear spoiler if the surrounding area on the body side is a conventional tailgate with a recess for the spoiler. Through the essentially conventional area on the body side beneath the outer skin, existing stiffness and thus also crash requirements are fulfilled. It is also possible in this way to attach hinges or a lock in the usual way. Another advantage of such a sub-structure is that, even when the outer skin is slit open, no objects can be removed from the trunk space located beneath.

In a favorable embodiment the spoiler forms at least in part a rear edge of the tailgate. To improve the aerodynamic properties of a vehicle, the generation of an aerodynamic negative lift on the rear axle is important. A sharp flow disruption edge on the rear edge of the tailgate is particularly suited for this. Such a sharp flow disruption edge, however, cannot be incorporated in the sheet metal of the tailgate without a lot of effort. By contrast, a spoiler that forms the rear edge of the tailgate at least in part can contain such a sharp rear edge. Usually, the spoiler in this design will not only form exclusively the sharp rear edge but also narrow strips of the two adjoining areas of the tailgate. In such a spoiler, a taillight is also easily integrated in the area of the rear edge. The outer skin stretched across must then be left open in the area of the taillight.

Depending on the spoiler position beneath the flexible and elastic material, the appearance of the entire tailgate can be modified substantially. For example, at low speeds when the spoiler is in the resting position, the tailgate can appear rather rounded and with a flowing outline. However when at higher speeds the spoiler is shifted from the resting position into a used position, the design of the tailgate can change into a very sporty tail with a sharp flow disruption edge.

The flexible and elastic material ideally has a magnetic coating. Through the magnetic coating the outer skin rests against the spoiler and the surrounding area on the body side in an adhesive manner if they consist of an iron metal. This can also prevent an undesirable fluttering of the outer skin at high travel speeds.

In another favorable further development the flexible and elastic material is additionally stretched across at least one rod, which is attached to one end of the spoiler. The rod will automatically move with the displacement of the spoiler. Apart from the spoiler and the surrounding area on the body side it will therefore contribute considerably to the shape of the outer skin and thus to the visual appearance. For this purpose the rod can also take on a bent shape, which depending on the spoiler position tenses the flexible and elastic material in a certain shape. To prevent this rod from being visible when the spoiler is in the resting position, an impression is arranged in the surrounding area on the body side in which the rod can rest. The impression is then covered with the tensed outer skin so that it is not visible.

Since the one end of the rod is firmly attached to the spoiler, relative motions are created in the other end of the spoiler to the surrounding area on the body side when the spoiler is shifted. This end of the rod is thus beneficially connected with a slide, which can be displaced on the surrounding area on the body side. This slide, being a purely functional component, should not be visible if possible. For this purpose the slide is beneficially located in an impression in the surrounding body-side area, across which the outer skin stretches, so that it is not visible from the outside.

Ideally the rod can consist of a similar material as tent poles, for example of fiberglass, aluminum, composite materials, steel etc. Such materials are light, robust, weather-resistant and yet slightly elastic so that the risk of lateral buckling is relatively low. The rods beneficially exhibit a low-friction coating, such as TEFLON. Due to the low-friction coating the outer skin can slide smoothly across without flapping. In its cross-section it can have a rectangular, round, oval, tear-shaped or L-shaped profile.

In another beneficial embodiment of the invention the section of the outer skin in the form a rocker panel of the vehicle can be deformed by at least one adjusting element such that it improves the aerodynamics of the vehicle during travel. A rigid rocker panel cannot have an optimal aerodynamic design because otherwise it would impair the passengers when entering and exiting to an intolerable extent. The visual appearance of such a rigid rocker panel would be incompatible with the appealing design. This issue can be resolved with a displaceable rocker panel, which when the vehicle is stopped or traveling at low speeds is located in a resting position so that it is possible to effortlessly get in and out of the vehicle. It is only at higher velocities that the rocker panel shifts from the resting position into a used position, which ensures the desired aerodynamic effects. Additionally the vehicle's side walls become less dirty with such a rocker panel because at high speeds the dirt glides along on the bottom or the rocker panel and is not splashed and whirled up on the side.

To accomplish this ideally an adjusting element, which is seated displaceably about an axis beneath the section, is provided. The adjusting element deforms the outer skin in different fashions as a function of the angle position, while the axis runs substantially in the vehicle longitudinal direction. The adjusting element can have different radial extensions on the circumference around the axis. This is a particularly simple arrangement, which nevertheless combines all advantages of a displaceable rocker panel. Additionally the rocker panel can have a varying outline across its longitudinal extension, which is coordinated with the remaining vehicle, without requiring several separate adjusting elements.

In another beneficial embodiment the section forms a flap of a vehicle, which the adjusting element can open or close. A flap of a vehicle is supposed to cover something in the closed position, such as a trunk, an engine compartment or a filler neck. In the opened position of the flap by contrast the area that was covered before should become accessible as effortlessly and completely as possible. For this purpose one side of the section can for example be tilted away or be rolled up from one side. Alternatively in a favorable embodiment the section can include a slot, which the adjusting element can expand into an opening. Such a flap however can also be implemented with two sections pursuant to the invention. For a closed flap the edges of the two sections meet with each other so that practically no gap remains between them. To open the flap, the two edges are shifted away from each other in a relative motion so that the area covered beneath becomes freely accessible.

The two sides of the slot and/or the two sections at the location of the joint can favorably be connected with each other by a zipper or a clip connection. This ensures safe connection with a closed flap. At the same time these two connections can also be undone quickly and effortlessly so that the flaps can be opened without difficulty. A locking system can also be incorporated easily for example with an electric zipper or power-actuated clip connection.

Alternatively, along the slot and/or along the edges of the sections, a rigid strip can be attached to at least one section, while at least one of these strips can be displaced by at least one adjusting element. The rigid strip allows bringing the slot sides and/or the edges into a defined shape. This facilitates defined opening and closing of the flap. These rigid strips are also well suited as contact points for an adjusting element so that the flap can be opened or closed also with power actuation.

In another interesting application the section is inserted as an outer skin in a tailgate so that its length can be varied in the longitudinal direction of the vehicle when the adjusting element displaces the rear windows in the longitudinal direction. This way it is possible to increase the passenger compartment as needed by displacing the rear window backward or also to increase the trunk by displacing the rear window forward. This enables very flexible usage of the vehicle.

Equivalent to the use of the section as spoiler, the section can also be modified in its aerodynamic shape as a front or rear component of a vehicle through at least one swiveling adjusting element. Front or rear components here represent parts, which are located on the front or rear end of the vehicle, and at least in part also represent the transition to the vehicle floor, such as for example bumpers. Aerodynamically particularly effective are front or rear components that are located just above the road. Such front or rear components, however, can accidentally be damaged easily, for example while parking the vehicle or leaving a parking spot close to relatively high curbs. Since such front or rear components like all aerodynamic components can really only exhibit their full effect at high speeds, it is useful that the front or rear components are shifted from a resting position into an active position by means of an adjusting element only at higher velocities.

In another favorable application the section can be lowered by means of an adjusting element as an underbody of a vehicle. The underbody should assume as favorable an aerodynamic shape as possible. As with all aerodynamic components, a noticeable effect only takes place at relatively high velocities. It is therefore useful to lower the underbody only beyond a certain speed. Since the section then covers both the exhaust system, including the catalytic converter, and the rear axle drive, the section naturally must be able to withstand also accordingly high temperatures. Additionally the section must not be affected detrimentally by kicked-up rocks.

In a particularly attractive application the section is one piece and represents a fender and an outside door panel at the same time, while the door represents the adjusting element. This eliminates the gap between the front door edge and the adjoining fender and considerably improves the visual appearance.

Also very effective is the use of the invented section as an outside door panel, whose height of the upper edge of the actual door body can be adjusted with an adjusting element. This way the height of the door's top edge can be varied. If desired and depending on the weather a particularly low top edge can be selected for example in nice weather and good mood or a particularly high top edge in poor weather or bad mood.

The section pursuant to the invention can beneficially also be used as a fender and wheel well. The section is then attached both to the chassis as adjusting element and to the body. The visible gap between wheel and wheel well can thus be kept very small without limiting travel of the wheel. This represents a considerable visual improvement. However the aerodynamic effect should also not be underestimated because the wheel well is a much more closed unit so that less undesirable air turbulence is created.

In a much more developed version the section can be displaced by means of an adjusting element as the vehicle roof with the rear edge in the longitudinal direction of the vehicle. Such an embodiment makes it possible for one to either enlarge the size of the passenger compartment or the trunk, and secondly the visual appearance of the entire vehicle can be modified considerably.

In a very aesthetic and nevertheless simple embodiment the section can be deformed by at least one adjusting element such that depending on the position of the adjusting element the section covers a headlight and/or a radiator grill to varying degrees and/or different partial regions of the headlight and/or the radiator grill. Depending on the type of coverage of the headlight, the vehicle can assume quite different appearances. When the section for example covers the headlight especially from beneath, the vehicle (with the headlights being the eyes) assumes a rather friendly appearance. The section can basically serve as the eyelid and in accordance with a human face convey the vehicle's different expressions. The same also applies to the radiator grill, which basically corresponds to the mouth and nose section of a face.

In a favorable further development at least two sections are used, which cover a headlight and/or a radiator grill to varying degrees and/or different partial sections of the headlight or the radiator grill. The "facial expression" of the vehicle can be modified to even more varying degrees with two or more sections. The facial expression can be modified both as a function of the speed, e.g. sporty at high speeds, and also as a function of the driver's mood.

Beneficially a lighting device is installed beneath the invented section, with said device shining at least partially through the section. For simplicity reasons the lamp can also be attached directly to the section for this purpose. For example lamps such as indicators, brake lights etc. can be hidden beneath the section. When the lamps are not in operation, they are not visible beneath the cover. The problem with the gap and the sealing issue are also non-existent here because the lamps are located in a dry area beneath the section. Alternatively the lamps however can also be used to provide extensive back-lighting of the section. For example the color of the section can also be modified to the likes of the driver.

The invented section can be deformed in a particularly simple version also by at least one adjusting element, which is a plug element that can be inserted detachably into at least one socket that is firmly installed in the body, and forms a portion of the vehicle frame across which the elastic section is stretched. The term adjusting. element used in connection with the invention also includes these plug elements, which can be exchanged quickly manually by the user or in a repair shop. The cross-section and the shape of the plug elements can be ideally selected freely. Similar to the Smart vehicle, the appearance of the vehicle can thus be modified effortlessly, for example by exchanging a few plug elements with others of a different shape beneath the section. The entire shape and characteristic of a vehicle can thus be modified considerably in next to no time.

Flexible folding tops for convertibles made of textiles are generally known. Such a folding top is described for example in European publication EP 0 530 134 B1. This top contains, among other things, textile tissue zones made of elastic rubber fibers, which are elastically ductile in length. With regard to length, elastically ductile tissue zones have to absorb only few forces.

Additionally, with regard to length, elastically ductile tissue zones are arranged such that they are normally covered, i.e. not exposed directly to UV light.

If now entire sections of the outer skin of a vehicle body are supposed to be made of an elastic material instead of sheet metal, this material must exhibit a very high resistance to tearing. Additionally, to avoid undesired noise and undesired aerodynamically caused flattening and wobble appearances, the material should be attached in a pre-stressed fashion, wherein it must never lose this pre-tension. Familiar tissues made of elastic rubber fibers are not suited as a material that has to exhibit a high resistance to tearing because they do not achieve the required elastic expansions.

A suitable section pursuant to the invention for a visible outer skin of a vehicle body can consist of a flexible planar textile formation, which is coated at least on the visible side. The planar textile formation represents the actual supporting layer. It is responsible for the stiffness, firmness and the associated protection from vandalism.

Textile planar formations can be tissues, knitted fabrics or fleece. A tissue consists of two fiber systems crossing perpendicular to each other, of which the chain (warp) runs vertically and the filling (woof) horizontally. The quality of a tissue depends, apart from the crossing of the fibers, on the material, thickness and type of thread, the finish, color, durability, pliability, stiffness, firmness and haft. Tissues for structural applications can generally be expanded only insignificantly in the longitudinal and transverse directions and are therefore less suited for the elastic material pursuant to the invention. Ductile tissues, which fulfill the required reversible ductility, however, can also be realized on the basis of highly ductile, for example texture-proof, threads. A fleece or a mat consists of randomly arranged filament yarn or staple fibers. Since the fibers here are arranged randomly, such a textile formation can have the undesired effect that it fluctuates heavily in its properties. Additionally a fleece does not exhibit a distinct spring-back behavior. Knitted fabrics are made of stitches and are produced on hosiery or knitting machines. Compared to a knitted fabric, fabrics have additional cross-connections between the stitches. Knitted fabrics expand well in the longitudinal and transverse directions. Fabrics, however, exhibit slightly different characteristics in the longitudinal and transverse directions. Ideally the planar textile formation therefore is a knitted fabric or a fabric. In the case of a knitted fabric, additionally, a unidirectional woof for reinforcement purposes can occur, i.e. additional fibers or threads can be introduced into the textile formation in one or more directions.

The elasticity of the material however is determined not only by the textile structure, but also by the material of the fibers and/or threads of which the textile formation consists. In order to achieve a very high resistance to tearing despite the elastic ductility, the elasticity should preferably come exclusively from the structure of the textile formation and not from the material of the fibers and/or threads of the textile formation. Therefore only relatively firm fibers can be considered, such as for example of polyamide, polyethylene teraphtalate, polyethylene, aramide fibers or steel fibers. Fibers made of polyamide have a low light fastness and are slightly hydrophobic and expensive. Beneficially the fibers are made of polyethylene teraphtalate (PES or PET). PES is a high-tensile material, has a low creep tendency, and its shrinkage can be adjusted. It takes on color well, and there is a broad spectrum offered. Availability is high, and the desired properties can be adjusted well through additives. Polyethylene by contrast, although it is extremely firm and highly tenacious, is very expensive, hydrophobic and has a low melting point as well as a distinct creep tendency. As a further development of PES, PEN of course is also very well suited. PEN has just slightly higher mechanical properties and a lower creep tendency. Aramide fibers are extremely tenacious, firm and temperature-resistant, but expensive, hydrophobic and have poor adhesive properties. Steel fibers are high-tensile and tenacious materials and are corrosion-proof. However they are expensive and problematic in their processing. Aramide fibers and steel fibers are therefore unsuited as sole materials, but can be admixed in order to increase protection of the textile formation against vandalism.

In the textile formation furthermore additional fibers can be integrated, which serve the purpose of sensors and/or actuators. For example, non pre-published German patent application DE 101 10 329.8 describes textiles into which fiber-optic fibers are introduced, which can be illuminated by a light source. From likewise non pre-published German patent application DE 100 29 237.2, a seat heater is known, which heats up locally only in areas in which a passenger actually applies pressure on the seat. For this purpose appropriate wires, which under load generate a contact with each other, can be woven into the textile seat cover.

The coating can be waterproof and represent the necessary protection from UV light. The coating is also responsible for wear and tear resistance as well as for appearance. The appearance includes not only the actual appearance, but also to what extent dirt is rejected by the coating or at least can be removed from there easily. It is only through the combination of a planar textile formation with the coating that all requirements regarding tear resistance, weather resistance, wear resistance and reversible elastic pre-tension ability can be fulfilled.

The coating consists favorably of an adhesive layer, an aromatic intermediate layer and an aliphatic top layer. The adhesive layer guarantees optimal adhesion of the coating to the textile tissue. The aromatic intermediate layer ensures water tightness and UV resistance, and the aliphatic top layer generates the desired visual outer appearance. Since the invented textile formation in vehicles is supposed to replace especially outer skin parts made of sheet metal, above all an appearance that is similar to a painted sheet metal surface is desired. For this, surfaces with different levels of luster (matte to high gloss) and with different levels of roughness (smooth or structured) are used.

Further beneficial embodiments form the subject matter of dependent claims.

The drawings depict several exemplary embodiments of the invention, which are described more closely in the following.

DETAILED DESCRIPTION OF THE INVENTION

Figure 1:
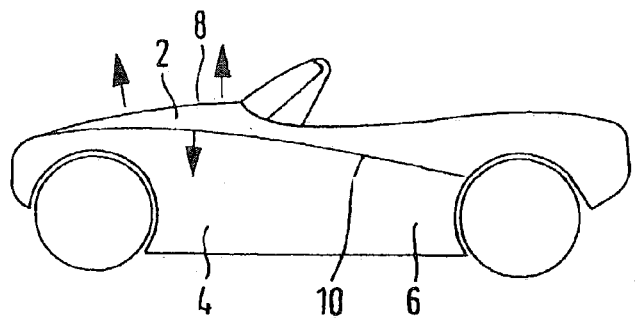
FIG. 1 is a side view of a vehicle with several sections beneath which several adjusting elements are arranged according to the invention.

FIG. 1 depicts a passenger car from the side. A space frame forms the supporting structure of this passenger car. Across this space frame a flexible and elastic cover material, which serves as planking, is stretched in the area of the hood 2, the front fender 4 and the side door 6. The shape of this cover material is hereby specified by the vehicle frame, across which the cover material is tensed. In order to achieve an aesthetic shape, apart from the supporting structure so-called splines 8, 10 are attached to the space frame, with the cover material being stretched across them for shaping purposes. These splines 8, 10 are simple rods, which are bent such that they stretch the cover material in the desired shape. They can be displaced in relation to the supporting structure by means of an actuator and serve thus as adjusting element. For example, spline 8, which marks the center of the hood 2 in the vehicle's longitudinal direction, can be lifted upward. Spline 10, which forms the transition between the hood 2 and the front fender 4, by contrast, can be lowered by means of an actuator and displaced slightly outward.

In this way it is possible, on a finished vehicle, to modify the visual appearance of the vehicle considerably just by moving the splines 8, 10 with actuators. This modification can be triggered for example with the push of a button in the dashboard and can thus occur as a function of the mood of the user of the vehicle. Alternatively the modification can also take place as a function of speed so that beyond a certain speed the vehicle assumes an aerodynamically more favorable shape or a design with a sporty appearance.

In the example shown in FIG. 1, additionally, the joint between the hood 2 and the front fender 3 is eliminated. This improves the visual appearance, and the otherwise required seals between hood 2 and fender 4 are no longer required.

Figure 2:
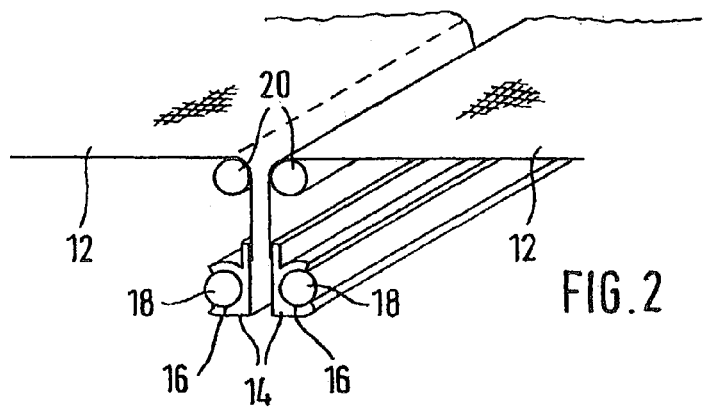
FIG. 2 is a view of an attachment of one edge of a section to a component that is firmly attached to the body with a clip connection.

The elastic material must hereby always maintain a certain level of pre-stress to prevent it from undesired flapping. In light of the very different ambient conditions, such as temperature, rain, ice, snow, relative wind etc., a relatively high level of pre-stress is required. The material shall nevertheless be fastened to the vehicle in a manner that permits a quick exchange. Ideally each. vehicle's user shall be able to replace the material himself when it is old or damaged. This would also make it possible to change the color of the vehicle at any time, simply by placing a material of a different color over the vehicle frame. Suitable fastening of the material is shown in FIG. 2.

A strip 14 made of a thermoplastic resin is sewn onto the edge of the flexible material 12. On the outer edge the strip 14 contains a C-shaped channel 16, with which it can be clipped onto a rod 18 in a form-fit manner. This rod 18 can be connected either directly with the body or be displaceable relative to the body by means of an adjusting element. These fastening arrangements are favorably arranged such that they are not directly visible from the outside. To accomplish this, the material 12 can for example be previously rerouted from the visible. vehicle's exterior inward with a spline 20 and be attached to the rod 18 there. The necessary retaining force of the clip connection in this configuration is additionally reduced by the frictional force between the material 12 and the spline 20.

Designing the vehicle's outer skin through such a flexible and/or elastic material 12 represents a very advantageous solution also in connection with separately displaceable outer skin parts. This will be explained in detail with a series of such applications.

Figure 3:
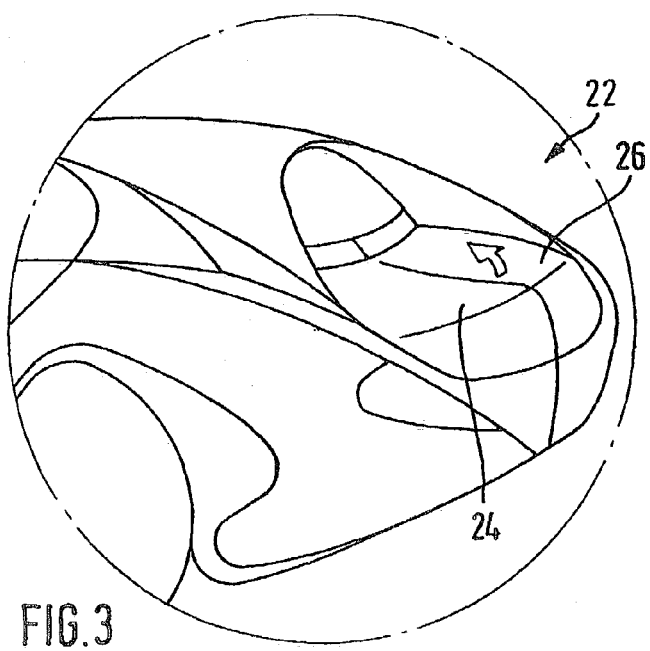
FIG. 3 is a view of a vehicle rear section with a rear spoiler.

FIG. 3 shows a solid view of a vehicle rear area 22. In the region of the tailgate 24 the outer skin 26 of the vehicle body consists of an elastic material, such as latex for example. This elastic material is tensed smoothly across a frame formed by the vehicle frame. Not visible from the exterior, an adjusting element is arranged beneath the elastic outer skin 26. This adjusting element can be shifted from the invisible resting position into a usage position by means of an electric actuating drive. In the usage position, the adjusting element elastically deforms the outer skin 26 from beneath and moves it in one area into the shape of a rear spoiler. As shown in the basic sketch in FIG. 4, the adjusting element can be in the form of a pivoted flap 28 in the front in the vehicle's direction. In the depicted usage position of the flap 28, in which it is tilted slightly upward through an actuator, the outer skin 26 is elastically deformed in a clearly upward fashion in the rear area of the tailgate 24. The outer skin 26 that has been deformed this way thus generates an aerodynamic flow disruption similar to a rear spoiler and thus reduces the lift on the vehicle's rear axle.

Figure 4:
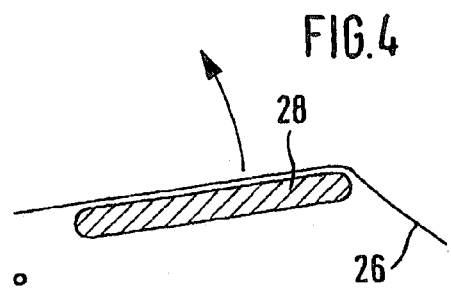
FIG. 4 is a sectional view of a rear spoiler according to FIG. 3.
Figure 5:
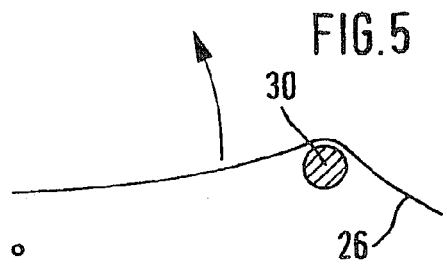
FIG. 5 is an alternative spoiler according to FIG. 3.

Alternatively to the embodiment of the adjusting element as flap 28, as shown in FIG. 4, an embodiment as hoop 30 is also possible, as shown diagrammatically in a sectional view in FIG. 5. A simple hoop 30, which consists for example of a bent pipe, is swiveled upward from a resting position into a usage position.

Figure 6:
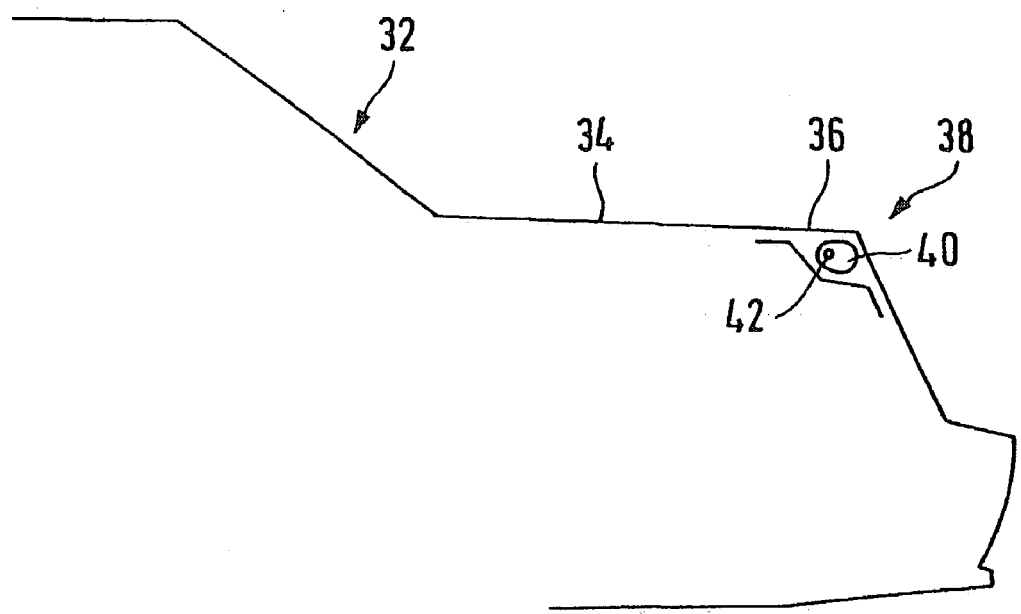
FIG. 6 is a sectional view through a vehicle rear area with a rear spoiler that has been integrated in the outer skin in a resting position.

FIG. 6 shows another variation as to how such a rear spoiler can be implemented on a rear section 32 of a vehicle. In the area of the tailgate 34, the outer skin 36 consists of an elastic material. This elastic material is stretched smoothly across a frame formed by the vehicle frame. Not visible from the exterior, an electrically driven adjusting element 40 is arranged beneath the elastic outer skin 36 in the area of the end section of the tailgate 34. The adjusting element 40 has an elliptic cross-section and is pivoted eccentrically laterally about an axis 42. In the depicted resting position, the adjusting element 40 does not come in contact with the elastic outer skin 36. The adjusting element 40 is only displaced at vehicle speeds of 120 km/h and above proportional to the vehicle speed.

Figure 7:
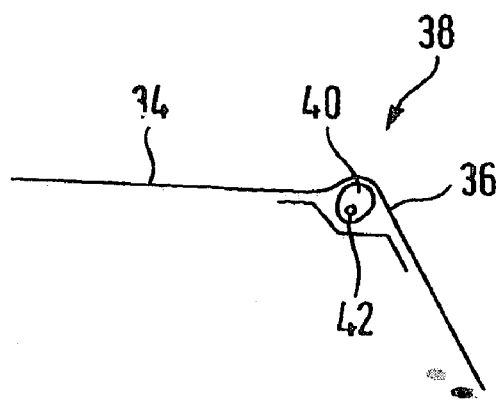
FIG. 7 is a sectional view through the vehicle rear area shown in FIG. 6 with the rear spoiler in a semi-assumed usage position.

FIG. 7 shows an intermediate position of the adjusting element 40, which roughly corresponds to a vehicle speed of 160 km/h. On the end section 38 of the tailgate 34 the adjusting element 40 already pushes the outer skin 36 clearly visibly upward with its cam. It deforms the outer skin 36 elastically from beneath and brings it into the shape of rear spoiler in this end section of the tailgate 34. The outer skin 36 deformed this way forms a flow disruption edge, which creates an aerodynamic flow separation and thus reduces the aerodynamic lift on the vehicle's rear axle.

Figure 8:
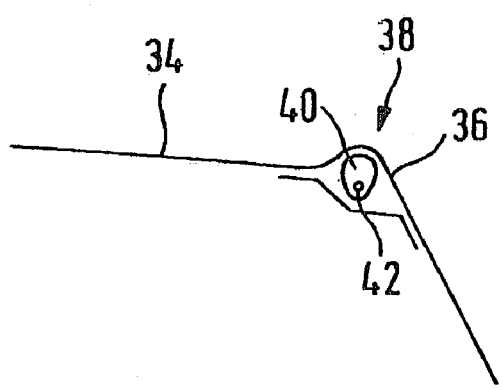
FIG. 8 is a sectional view through the vehicle rear area shown in FIG. 6 with the rear spoiler in a fully assumed usage position.

FIG. 8 shows the adjusting element 40 in the maximum upwardly swiveled position, which is achieved at the vehicle's maximum speed. In this position, the elastic outer skin 36 is flattened upward in the end section 38 of the tailgate 34 by about 25 mm compared to the resting position.

The outer skin 36 is tensed smoothly in all positions of the adjusting element 30 due to its elasticity. Such an integration of the functionality of a rear spoiler does not disrupt the. design and is mechanically less complex than classic telescoping rear spoilers, as we know them for example in existing vehicles. The required space is also considerably less than is the case with conventional rear spoilers. It no longer contains a visible gap between the spoiler and the tailgate, and the sealing issue of the gap is also eliminated because all these areas are covered with the waterproof outer skin 36.

Figure 9:
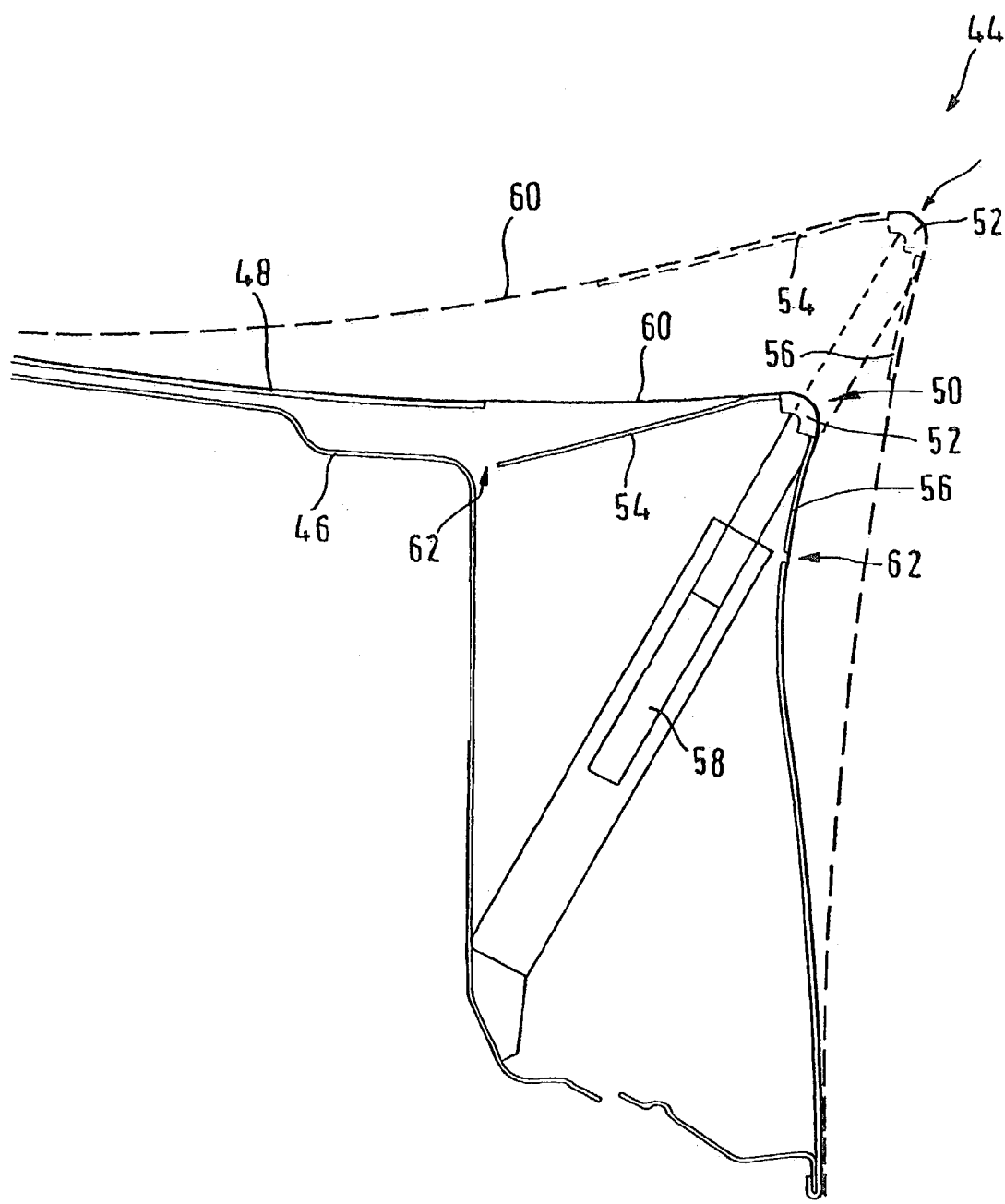
FIG. 9 is a sectional view, in the longitudinal direction of the vehicle, through a tailgate with a displaceable rear spoiler.

FIG. 9 depicts another variation of such a rear spoiler. The tailgate 44 shown in a stressed-skin design contains an inside metal plate 46 and an outside metal plate 48. The outside metal plate 48 contains a recess in the area of the rear edge 50 and a spoiler 52 has been inserted as the adjusting element. Together with a steel plate the spoiler 52 forms on one hand the sharp rear edge 50 and on the other hand a small strip 54 and 56, respectively, of the areas adjoining the rear edge 50. The spoiler 52 is displaceable in a linear fashion from the resting position into a usage position, indicated with dotted lines, through two pneumatic cylinders 58. An electric or hydraulic drive for the spoiler 52 would also be feasible. An elastic tissue 60 stretches across the entire area of the tailgate 44 shown, including the spoiler 52. It also covers the gap 62 between the spoiler 52 and the outside metal plate 48 so that it is not visible from the outside. The tissue 60 contains a magnetic coating, which causes it to rest against the outside metal plate 48 of the tailgate 44 and the steel plate 50, 54 and 56 of the spoiler 52 as much as possible in an adhesive manner. The tissue 60 additionally contains a coating on the visible side, whose texture looks like sheet metal. Said coating can have either exactly the same color as the rest of the vehicle or it can consciously be done in a different color for accent purposes.

The visible outer skin is formed by the tissue 60 so that the outside metal plate 48 located beneath must neither have the surface quality nor the paint quality of a regular outside metal plate. It even suffices if the outside metal plate 48 is only primed to prevent corrosion. Additionally no complex sealing concepts are required for preventing water from penetrating into the gap 62.

The outside metal plate 48 and the steel plate 50, 54 and 56 of the spoiler 52 are designed such that the tissue 60 is tensed in every position of the spoiler 52 such that no edges show in the outer skin. For this purpose, in the resting position of the spoiler 52, the tissue 60 rests on top of the tailgate 44 only against the outside metal plate 48 and the rear edge 50. of the spoiler 52. It stretches freely across the strip 54 formed by the spoiler 52. The tissue 60 so-to-speak forms an extension of the outside metal plate 48 towards the rear edge 50. In the usage position of the spoiler 52 by contrast the tissue 60 rests against the rear edge 50 and the adjoining strip 54. It stretches freely across the area of the outside metal plate 48 adjoining the gap 62 and thus forms quasi an extension of the strip 54. The same applies to the rear of the tailgate 44.

Figure 10:
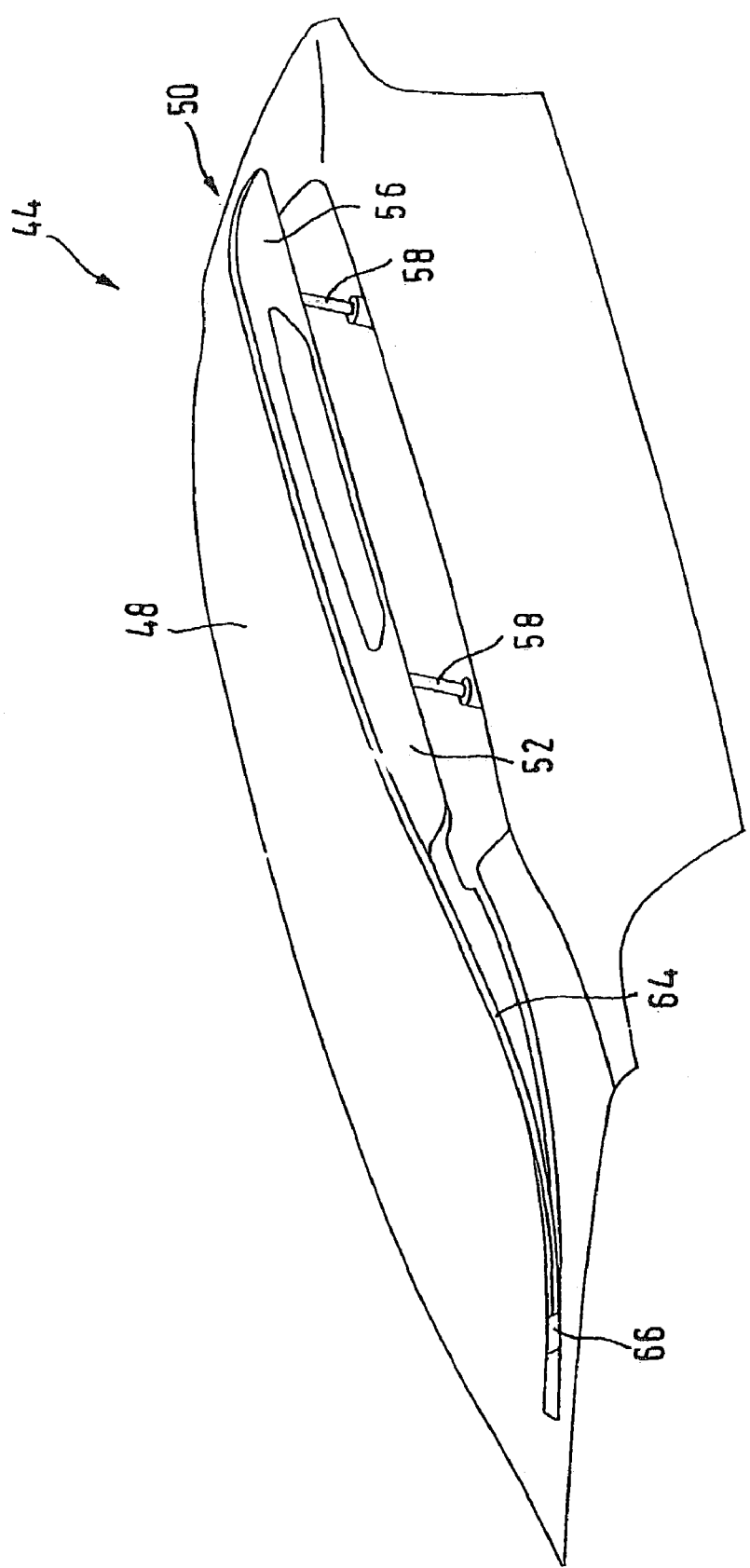
FIG. 10 shows the tailgate with rear spoiler from FIG. 9 in a perspective view.

FIG. 10 shows the tailgate 44 with the spoiler 52 in the usage position without the outer skin made of the tissue 60. Into the rear edge 50 of the spoiler 52 a rod 64 made of TEFLON is introduced, which protrudes laterally to the left and right of the spoiler 52 and forms an extension of the rear edge 50. On the left and right said rod 64 is symmetrically bent forward and runs level on the outside metal plate 48. Since the rod 64 is firmly attached to the spoiler 52, relative motions of the free ends of the rod 64 to the outside metal plate 48 are created when displacing the spoiler. These free ends of the rod 64 are therefore connected with a slide 66, respectively, which can be displaced on or in the tailgate 44. Since the slides 66 are not exactly pretty to look at, they are arranged in an impression in the outside metal plate 48. These impressions with the slides 66 arranged therein are not visible because the tissue 60 extends across the tailgate 44. The rod 64 serves the purpose of shaping the tissue 60 when the spoiler 52 is not in the resting position. Similar to a tent, the rod 64 stretches the tissue 60 in an aesthetically pleasing shape. This way the tailgate 44 can assume different shapes depending on the position of the spoiler 52.

In the resting position of the spoiler 52 the rod 64 is not supposed to deform the tissue 60. For this purpose an impression, in which the rod 64 rests when the spoiler 52 is in the resting position, is provided in the outside metal plate 48 to the left and right of the spoiler 52, respectively.

When exceeding a vehicle speed of about 80 km/h the spoiler 52 is shifted from the resting position into the usage position. Vice versa however it does not retract again until the vehicle speed is less than about 50 km/h because in the appropriate controls a switching hysteresis is taken into consideration.

Apart from an application of this flat and flexible section of an outer skin of a vehicle in the area of the rear spoiler, it is also useful in applications in the area of a rocker panel.

Figure 11:
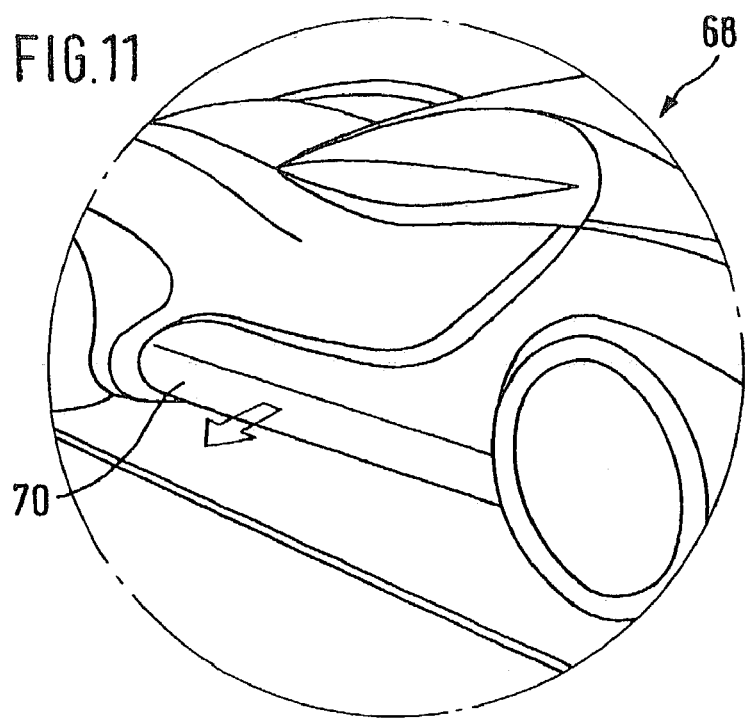
FIG. 11 is a view of a vehicle side with a rocker panel having a size which can be varied.

FIG. 11 depicts a solid view of a vehicle side 68 with a rocker panel 70 whose size can be adjusted and across which elastic material 76 is stretched. At high vehicle speeds, an actuator can deform the rocker panel 70 elastically such that it becomes wider and thus assumes an aerodynamically more optimal shape. Since this telescoped rocker panel 70 would impair the process of getting in and out of the vehicle, it is moved out only at high vehicle speeds. The appropriate mechanism is shown in a diagrammatic view in FIG. 12. A pivoted metal sheet part 74 bent like a rocker panel and containing a hinge 72 is arranged as an adjusting element beneath the elastic material 76 in an invisible resting position, as the left of the image reflects. When this bent metal sheet part 74 bent like a rocker panel is swiveled outward by an electric actuator, which is not shown here, it presses laterally into the elastic material 76, which forms the rocker panel 70, and there clearly outlines its shape on the front of the material 76, as shown in the right half of the image.

Figure 13:
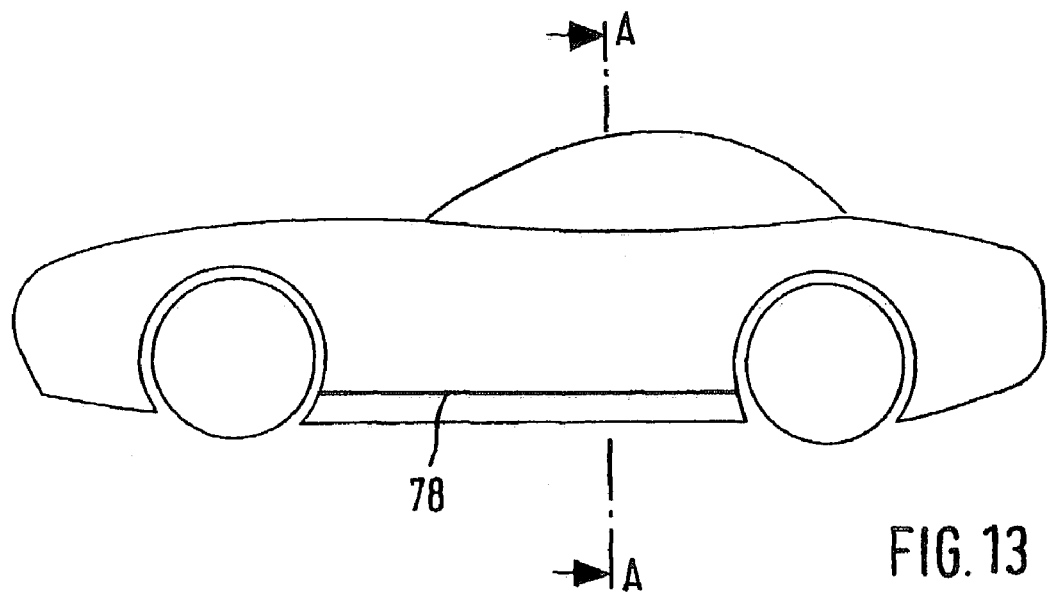
FIG. 13 is a side view of a vehicle with a displaceable rocker panel.
Figure 14:
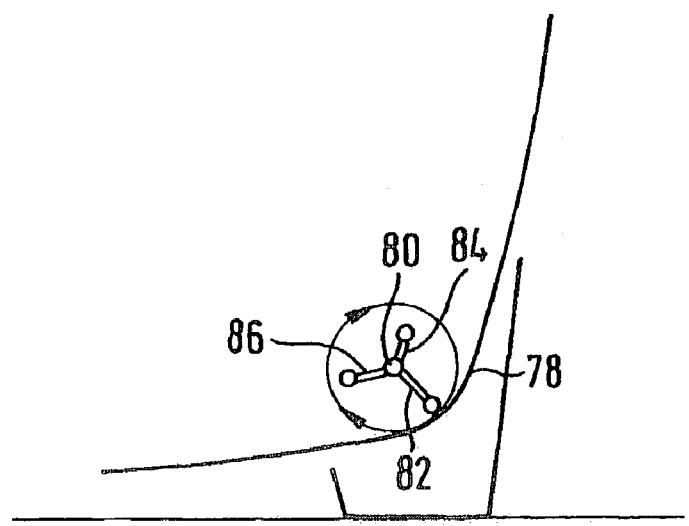
FIG. 14 is a cross-sectional view along line A—A through the rocker panel of FIG. 13.

An alternative version of such a rocker panel is shown in FIGS. 13 and 14. FIG. 13 is view of a passenger car shown from the side. The passenger car contains a distinct rocker panel 78, which extends between the front and the rear wheels in the vehicle's longitudinal direction. An elastic material, which forms the visible outer skin, stretches across the rocker panel 78. Adjusted to the respective vehicle speed, the rocker panel 78 can assume several different shapes. The functionality of the rocker panel 78 can be seen in the sectional view A—A in FIG. 14. The rocker panel 78 consists of a shaft 80, which extends in the vehicle's longitudinal direction and which being electrically driven (as an adjusting element) can assume various angular positions. Parallel to the shaft 80, three rods 82, 84, 86 are arranged on the shaft 80 while being offset from each other by 120°, respectively. Each rod 82, 84, 86 has a different distance to the shaft 80. Which of the three rods 82, 84, 86 deforms the elastic material in the area of the rocker panel 78 and thus specifies the shape of the rocker panel 78 depends on the angular position of the shaft 80. If it is for example rod 82 that has the largest distance to the shaft 80, then the elastic material is deformed substantially and the rocker panel 78 will appear very clearly.

Figure 15:
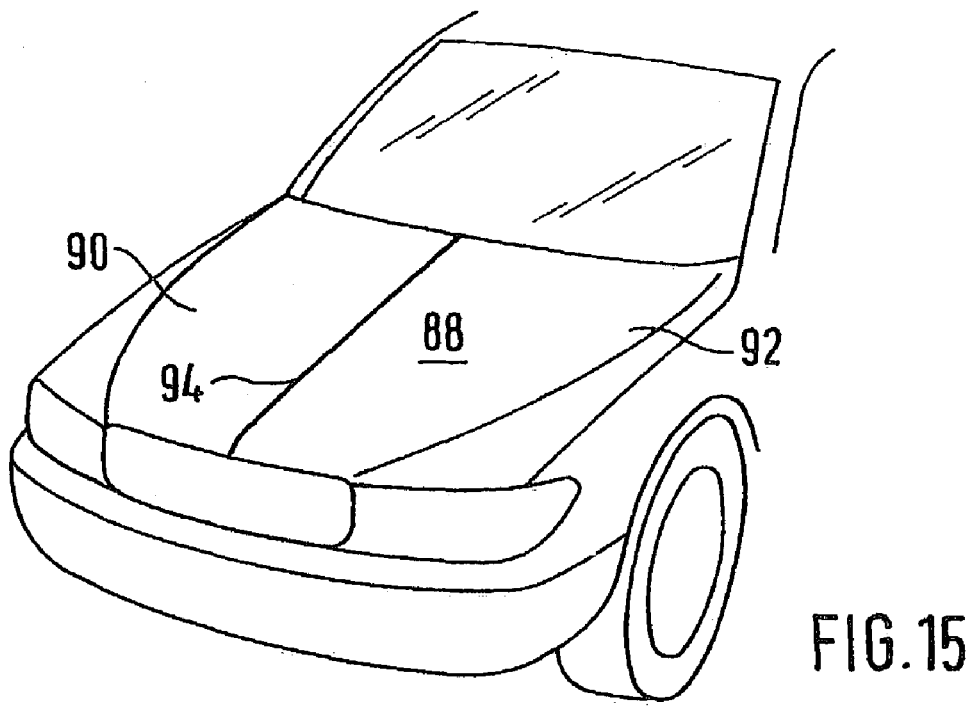
FIG. 15 is a perspective view of a vehicle with a closed hood.
Figure 16:
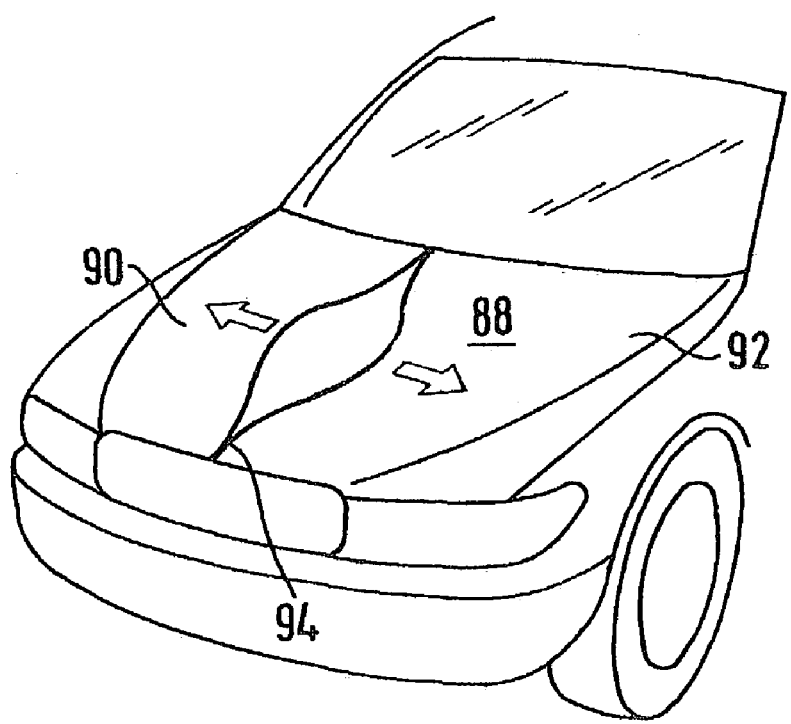
FIG. 16 is a perspective view of the vehicle of FIG. 15 with an opened hood.

An outer skin made of an elastic material can also be used for vehicle flaps. This will be. explained in the following based on FIGS. 15 and 16. FIG. 15 shows a hood 88 of a passenger car in the closed state. In the center the hood 88 is divided in the vehicle's longitudinal direction into two sections 90 and 92 consisting of an elastic material. The two sections 90 and 92 are connected with each other through an electric zipper 94 as the adjusting element. To open it, only the electric zipper 94 must be opened. Then, as shown in FIG. 16, the two sections 90 and 92 can be pulled apart starting from the zipper 94 area so that the area beneath becomes accessible.

Figure 17:
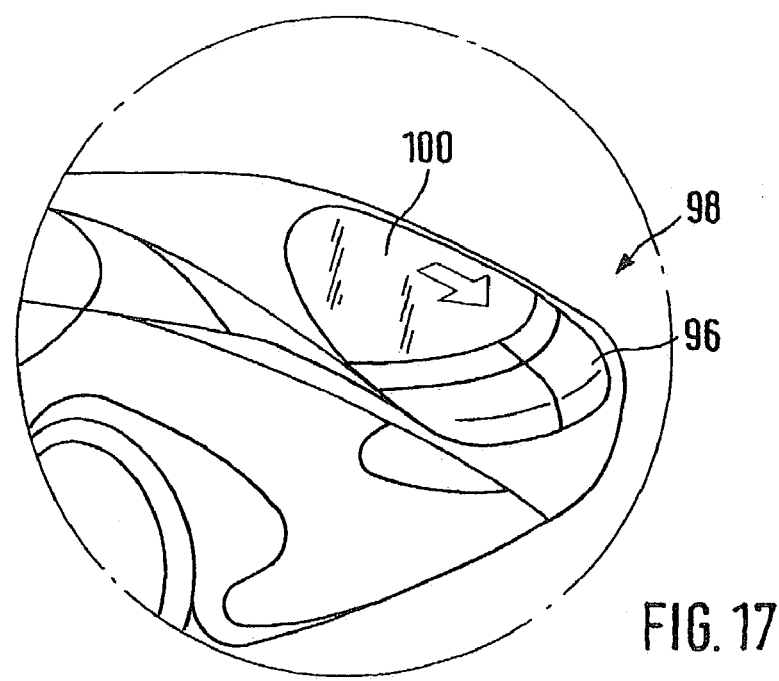
FIG. 17 is a view of a vehicle rear section with a small rear flap having a size which can be varied.
Figure 18:
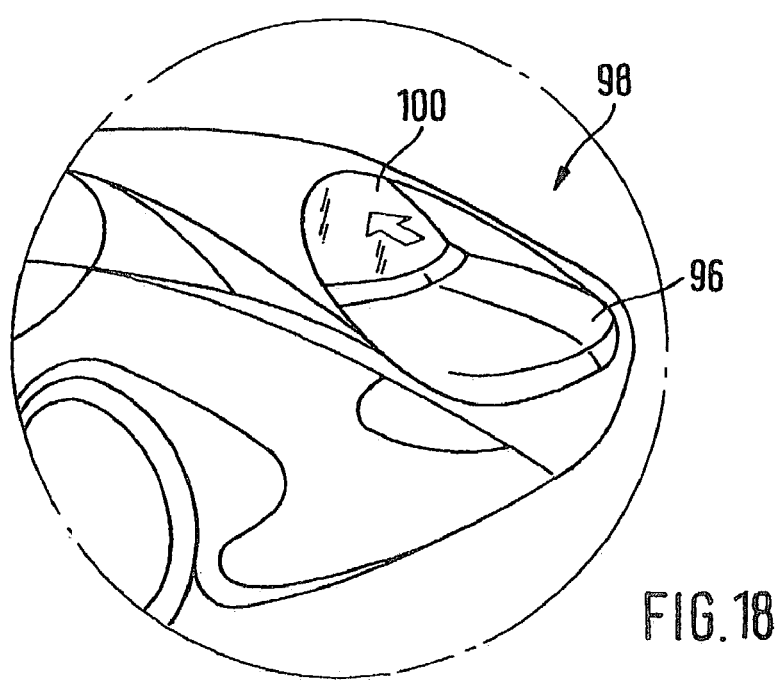
FIG. 18 is a view of the vehicle rear section of FIG. 17 with a large rear flap having a size which can be varied.

A different application is shown in FIGS. 17 and 18. They show a tailgate 96 made of an elastic material with variable lengths in the longitudinal direction of the vehicle. FIG. 17 shows a solid view of a vehicle rear section 98. The depicted rear window 100 can be displaced in the vehicle's longitudinal direction as an adjusting element and is located in the rear end position. In this position the tailgate 96 is the shortest. Nevertheless the flexible material, of which the tailgate 96 consists, does not sag, but is still slightly tensed because due to its elastic properties it cannot contract so much. FIG. 18 shows the same vehicle rear section 98, however the rear window 100 is located in the front end position. In this case the tailgate 96 is the longest. The elastic material of the tailgate 96 is stretched the most. In this way, depending on the associated needs, either the trunk or the space in the passenger compartment for passengers on the back seats can be increased.

Figure 12:
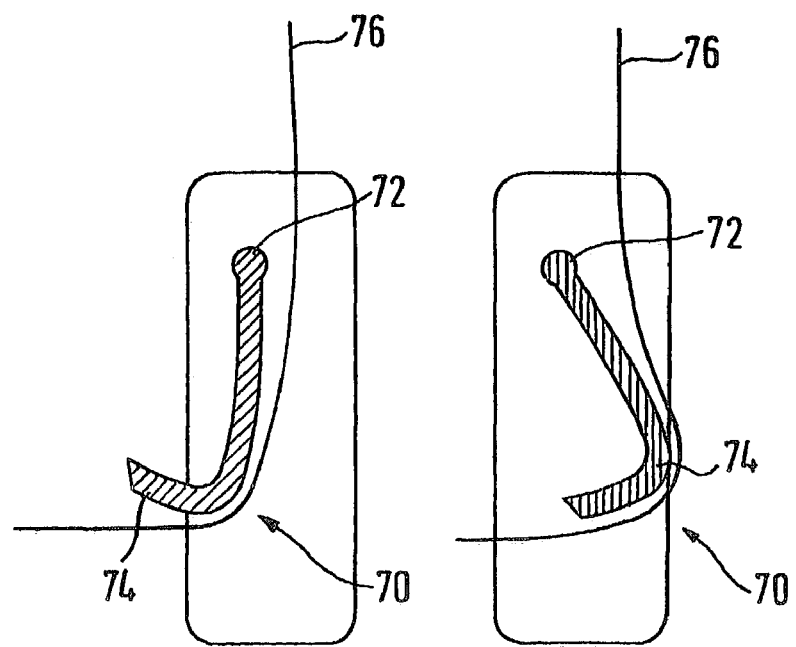
FIG. 12 is a sketch of the mechanism of the rocker panel of FIG. 11 with a size which can be varied.
Figure 19:
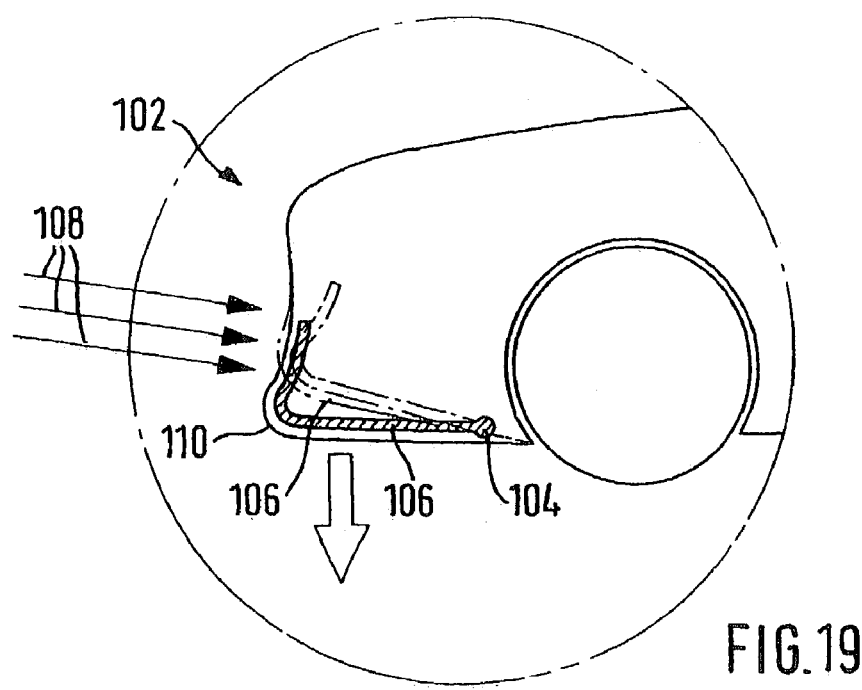
FIG. 19 is a side view of a vehicle front area with an aerodynamic shape which can be varied.

Based on a similar concept as that of the rocker panels in FIGS. 11 and 12, front and rear parts whose aerodynamic shape can be modified can also be implemented. For illustration purposes FIG. 19 shows a vehicle front 102 from the side. At high vehicle speeds, the vehicle front 102 lowers downward into an aerodynamically more optimal shape, triggered by the relative wind. Here as well a pivoted metal sheet part 106 bent like a front part and containing a hinge 104 is arranged as an adjusting element beneath the elastic material 110 in an invisible resting position. When this bent metal sheet part 106 bent like a front part is swiveled into the lower usage positions by the pressure of the wind 108, it presses on the bottom into the elastic material 110, which forms the vehicle front 102, and there clearly outlines its shape on the outside of the material 110.

Figure 20:
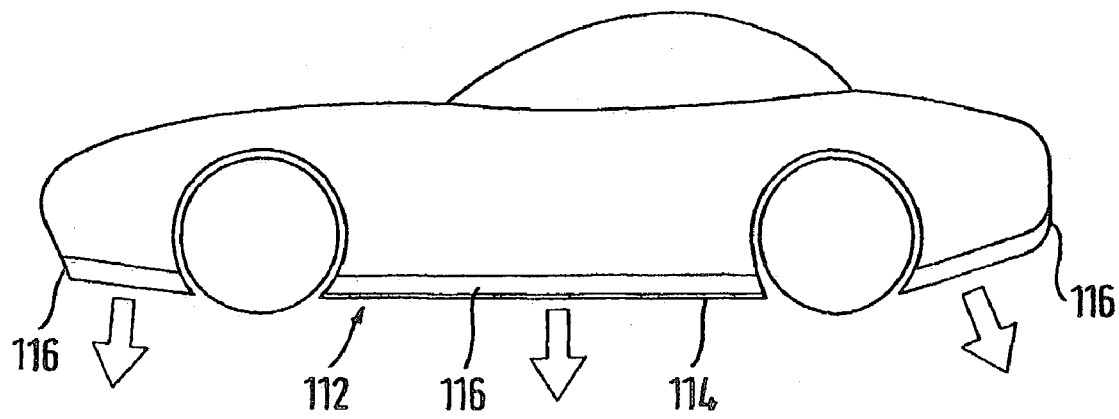
FIG. 20 is a side view of a vehicle with evenly displaceable underbody.
Figure 21:
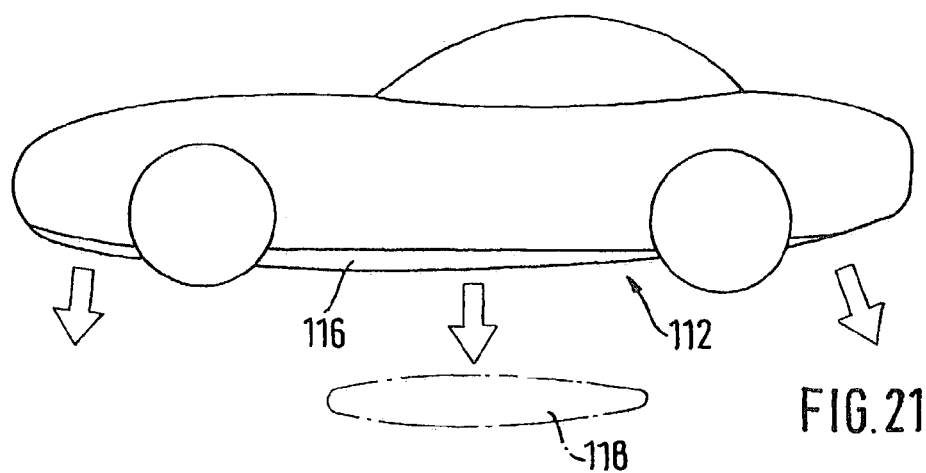
FIG. 21 is a side view of a vehicle with unevenly displaceable underbody.
Figure 22:
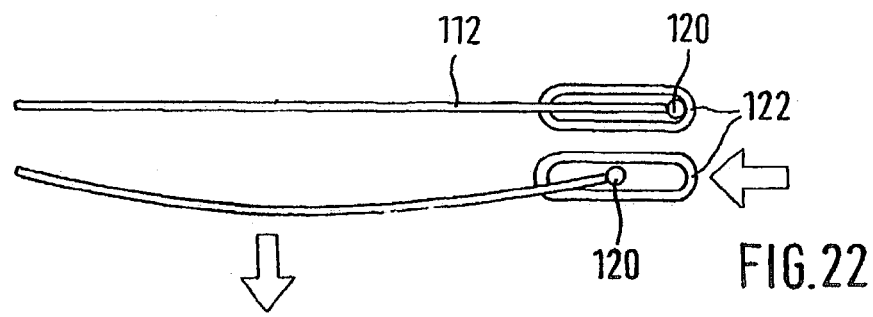
FIG. 22 is a sketch of the mechanism of the displaceable underbody shown in FIG. 21.

Just as easy to implement is an underbody of a vehicle that can be lowered, with said underbody consisting at least in part of a flexible material. To accomplish this, at least two different mechanisms are available. In the first mechanism shown in FIG. 20, the underbody 112 is lowered evenly basically across the entire length of the vehicle. The actual underbody here consists of a solid material 114, however around the entire circumference the connection of the underbody to the body is established with an elastic material 116. In the second mechanism shown in FIG. 21, the underbody 112 is lowered considerably more around the vehicle's center and thus forms a shape similar to the bottom of the wing of an airplane 118. For this purpose, the underbody 112 consists of a slightly flexible material 116 because otherwise the underbody 112 would flutter undesirably. This slightly flexible material 116 permits exactly a deformation of the underbody 112 between the plate-like shape when resting against the vehicle floor and the wing-like shape in the lowered state. The appropriate mechanism is shown in a basic sketch in FIG. 22. The back end of the flexible underbody 112 consists of a rigid rod 120, which is guided the left and right in a gate 122.

With an electric actuator, which is not shown here, the rigid rod 120 and therefore the back end of the underbody 112 can be pushed from the rear position shown in the upper section of the image forward in the gate guide 122, as shown in the lower section of the image. Since the front end of the underbody 112 is firmly attached to the supporting structure of the vehicle and the underbody 112 cannot be modified with regard to its length, it is lowered in the center when the back end with the rod 120 is displaced forward.

Figure 23:
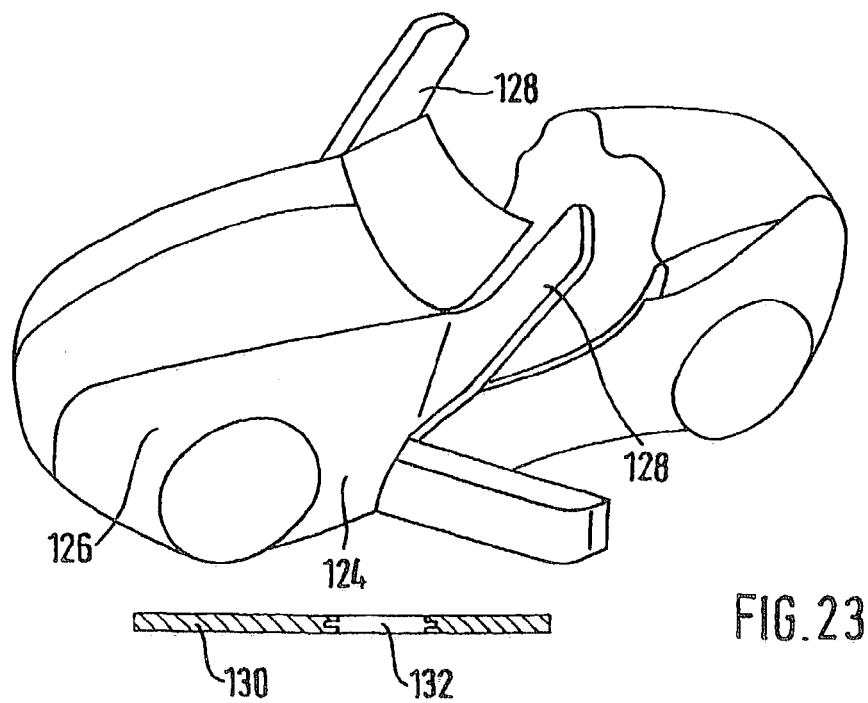
FIG. 23 is a view of a vehicle with a single-piece outer skin section which forms both a fender and an outside door panel.

FIG. 23 shows a visually very aesthetic application. The entire outer skin 124 of a fender 126 and a vehicle door 128 is designed as one piece made of elastic material. A gap on the outside in the outer skin 124 between the fender 126 and vehicle door 128 is no longer required. A sealing of the gap that is otherwise required can thus be eliminated. The gap is covered with the same elastic material as that of the outer skin 124 of the fender 126 and the vehicle door 128. When opening the vehicle door 128 the elastic material can contract over the gap enough that the material, without flapping, covers the gap in a slightly tensed manner. When closing the vehicle door 126 the elastic material is expanded across the gap again enough that it covers the gap in a tensed fashion without tearing. For obtaining an optimal shape, the elastic outer skin 124 can also additionally be supported by a rod 130, which extends from the fender 126 across the gap into the vehicle door 126. Said rod 130 contains an elastic section 132 in the center, wherein said section is able to follow the necessary movements in the area of the gap when opening and closing the vehicle door 128.

Figure 24:
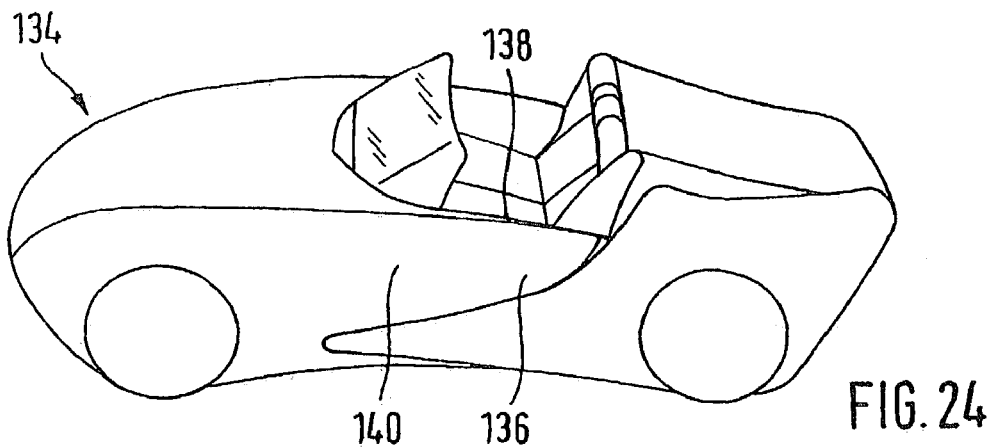
FIG. 24 is a solid view of a vehicle with height-adjustable upper door edge in the lowest position.
Figure 25:
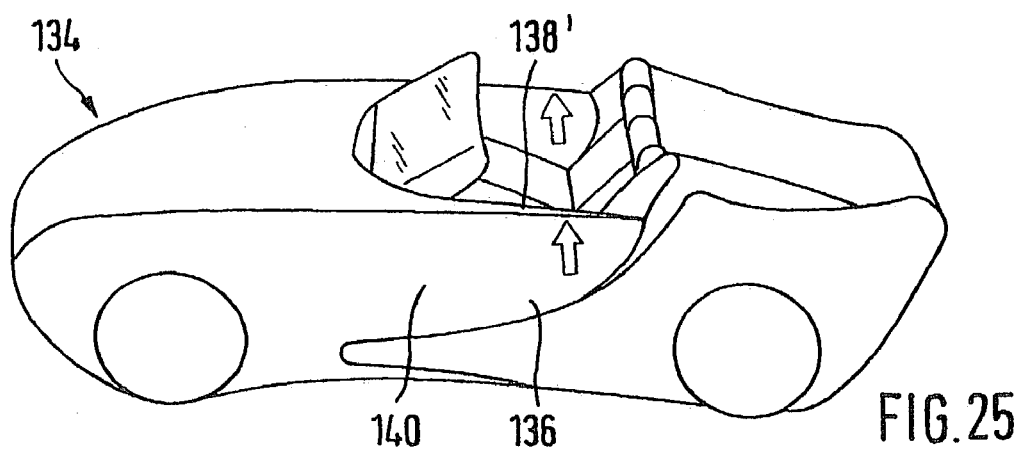
FIG. 25 is a view of the vehicle shown in FIG. 24 with the upper door edge in the center position.
Figure 26:
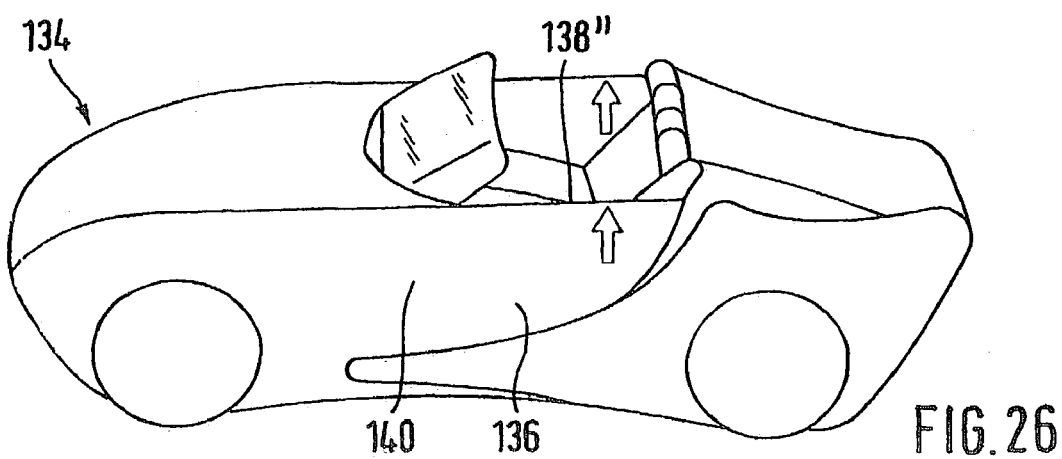
FIG. 26 is a view of the vehicle shown in FIG. 24 with the upper door edge in the highest position.
Figure 27:
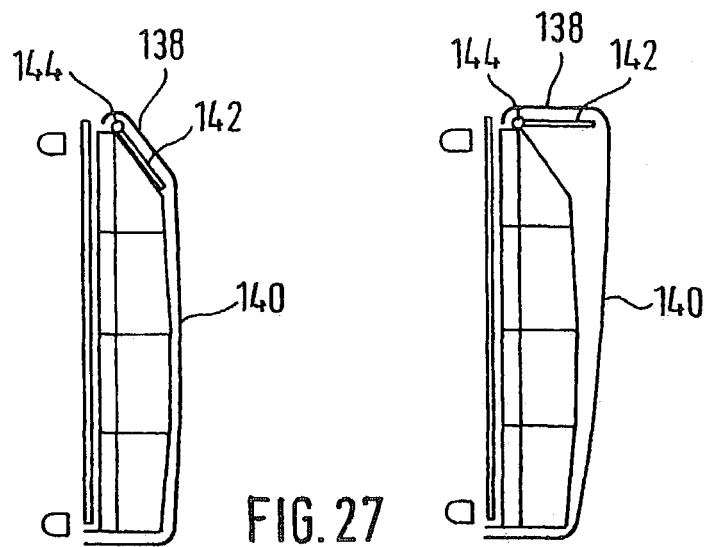
FIG. 27 is a sketch of the mechanism of the height-adjustable upper door edge shown in FIGS. 24, 25, and 26.

FIGS. 24 through 26 each show a solid view of a vehicle 134 with a vehicle door 136, whose top surface 138 can change with regard to height. In FIG. 24 the top surface 138 of the vehicle door is in the lowest position, in FIG. 25 in the center position 138' and in FIG. 26 in the highest position 138". For this purpose the outer skin 140 of the vehicle door 136 consists of elastic material. Hidden beneath this outer skin 140, an adjusting element is arranged on the top surface 138, 138', 138" of the vehicle door 136, as shown in FIG. 27 in a basic sectional view through the vehicle door 136. Said adjusting element is pivoted in the form of a flap 142 on the edge of the top surface 138, 138', 138" that faces the vehicle interior by means of a hinge 144, as depicted in the left section of the image. With a pneumatic actuator, which is not shown here, the flap 142 can be swiveled about the hinge 144 upward, as is indicated in the right section of the image. Since the flap 142 is covered with the elastic outer skin 140, the top surface 138, 138', 138" of the outer skin 140 of the vehicle door 136 shifts along with the flap 142 upward or downward. This way, depending on the mood of the driver, a rather open or a rather closed overall impression can be conveyed.

Figure 28:
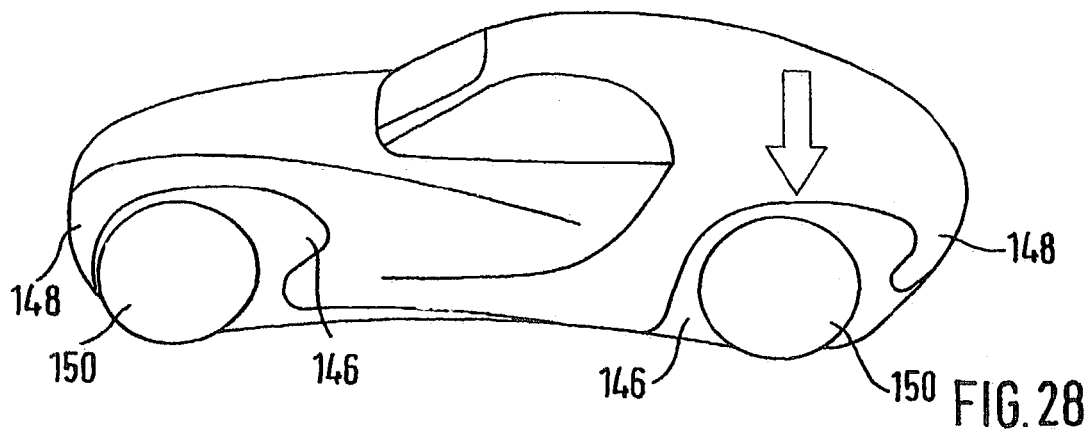
FIG. 28 is a view of a vehicle with a single-piece, movable outer skin section which simultaneously is a fender and a wheel well.
Figure 29:
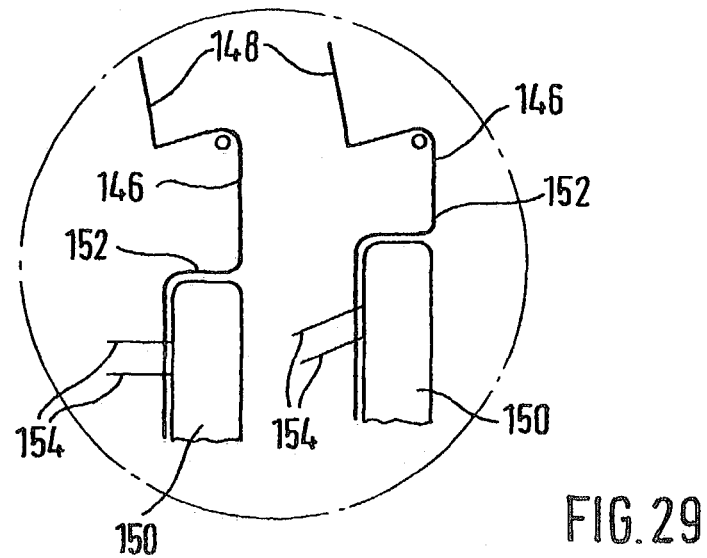
FIG. 29 is a sketch of the outer skin section moving mechanism of FIG. 28.

FIG. 28 shows an application of an elastic outer skin on a wheel well 146. Due to the outer skin's elasticity it is possible not to have to hold the spring excursion of the suspension completely in the wheel well 146. The elastic material of the wheel well 146 is on one hand connected with a solid fender 148, on the other hand with the suspension. This way the wheel well 146 can be attached very close to the actual tire 150. The exact functionality can be viewed in the basic sectional view in FIG. 29. Around the tire 150 a solid molding 152 is attached to the suspension 154 in the upper region. The area between the outer edge of said molding 152 and the fender 148 is bridged with the wheel well 146 made of elastic material. Said elastic material is always evenly tensed due to its pre-stress, even if depending on the deflection of the tire 150 the suspension 154 and thus the molding 152 assumes the lowest, as shown on the left, or the highest, as shown on the right, position.

Figure 30:
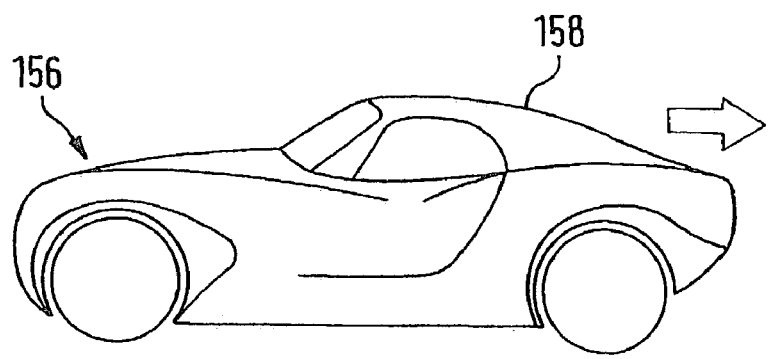
FIG. 30 is a side view of a vehicle with a displaceable roof in the rear position.
Figure 31:
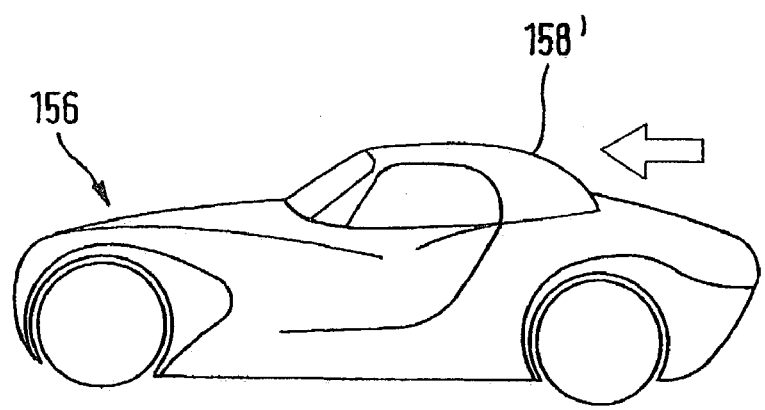
FIG. 31 is a side view of the vehicle of FIG. 30 with the displaceable roof in the front position.
Figure 32:
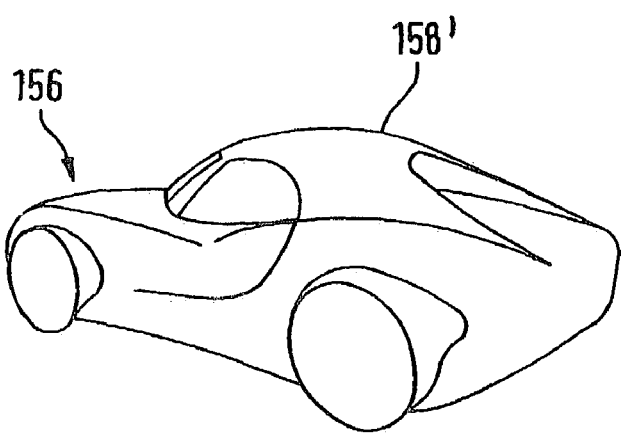
FIG. 32 is another view of the vehicle of FIG. 30.

Applications in the roof area are also possible. FIG. 30 shows a side view of a vehicle 156 with a variable top 158 made of elastic material in the rear position. FIG. 31 depicts the same top 158' in the front position. The lower rear edge of the top 158' can be displaced in the vehicle's longitudinal direction. Due to the elasticity of the material, the passenger compartment beneath the top 158, 158' can thus be varied in its size. For illustration purposes FIG. 32 shows a solid view of the vehicle 158 from FIG. 30 with the top 158' in the front position.

Figure 33:
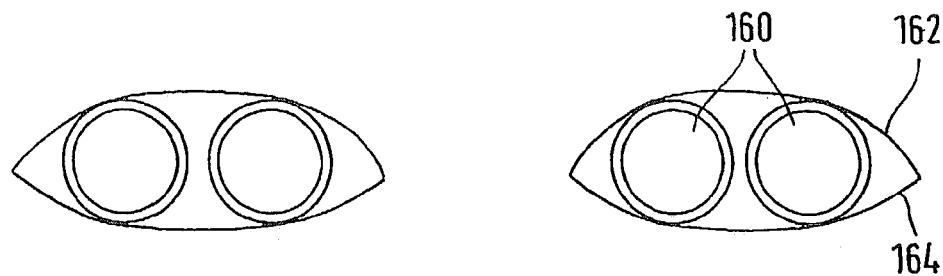
FIG. 33 shows a headlight with a friendly expression.
Figure 34:
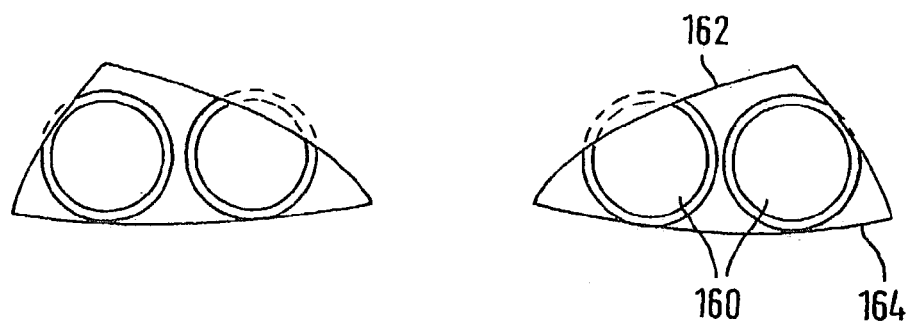
FIG. 34 shows the headlight of FIG. 33 with an unfriendly expression.

A less spectacular, but very effective application is possible for headlights. FIG. 33 shows two headlights 160, which are arranged next to each other and which each are covered from the top and the bottom in part by a section 162 or 164 made of a flexible material. If now the front view of the vehicle with such headlights 160 is regarded as a face, the headlights 160 correspond to the eyes. In FIG. 33 the two sections 162 and 164 cover the headlights 160 in part such that it appears as if the "eye" is laughing. Through adjusting elements however the sections 162 and 164 can also be displaced such that they cover the headlights 160 such that they turn into an unfriendly image as that in FIG. 34. Said modification of the vehicle's appearance can in turn be controlled for example from inside the vehicle in dependency on the mood of the vehicle's user.

Figure 35:
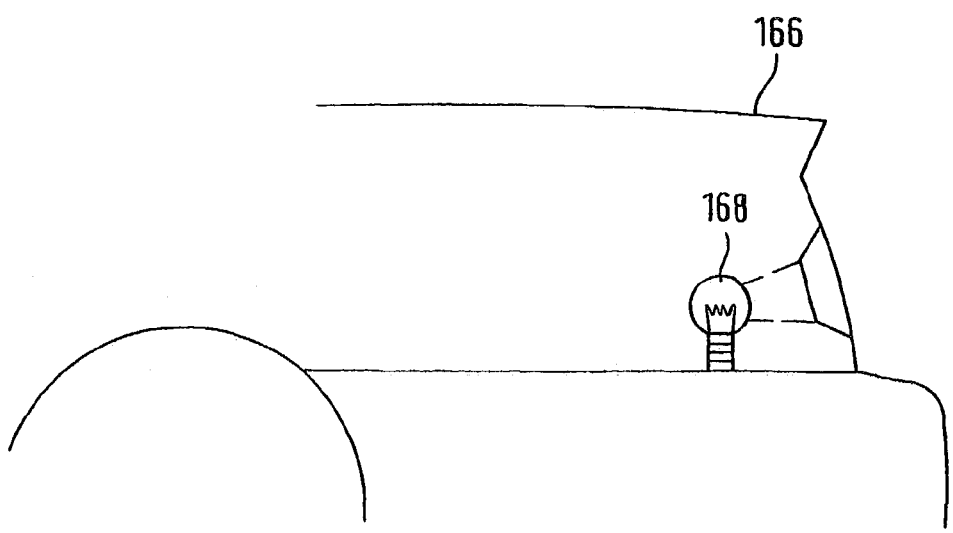
FIG. 35 shows a lamp that is arranged behind a section pursuant to the invention.

An outer skin of a vehicle, which consists of a flexible and/or elastic material, offers additional basic opportunities for equipping the vehicle with more individual features. As shown in FIG. 35, for example a lamp 168 can be arranged beneath the material 166. Said lamp 168 shines at least partially through the material 166 to the outside when it is turned on. The material 166 should therefore be relatively transparent at least in the area of the lamp 168 so that the required luminosity is reached on the outside. For example indicator or brake lights can be implemented this way, which are only visible from the outside when they are turned on. In this way no gaps are created, and no more sealing is required between the lamps 168 and the adjoining body.

So-called ambient lighting however is also feasible. The lamp 168 or lamps do not shine through the material 166 as much in certain points, but instead light it over a large surface from behind. This way the vehicle, for example in the dark, can have a slightly lit outer skin in the color of the respective lamp 168.

Figure 36:
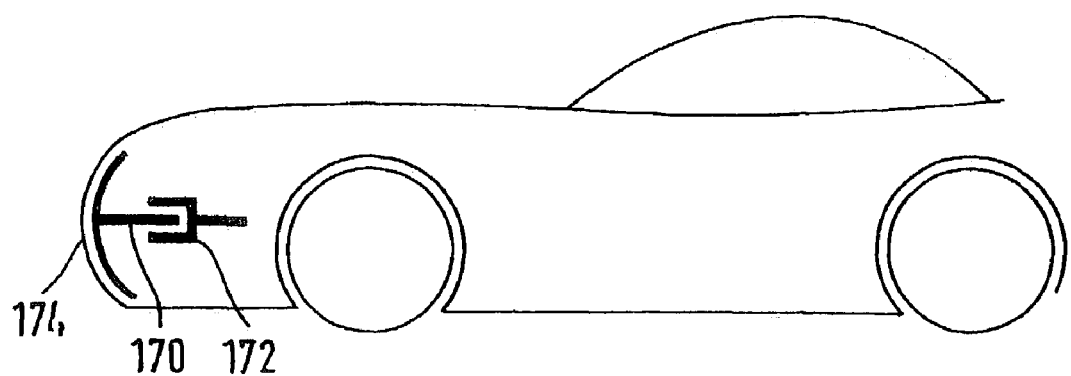
FIG. 36 is a sketch of a plug element which is stretched across a section.
Figure 37:
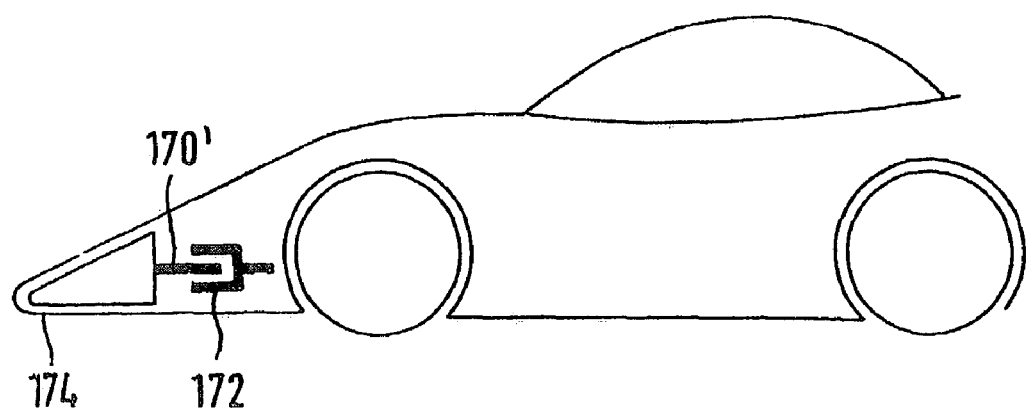
FIG. 37 is a sketch similar to FIG. 36 but showing a different plug element.

In all applications so far described, actively displaceable adjusting elements have been provided. In some areas it suggests itself that the adjusting elements are designed as plug elements. Such plug elements are splines 170, which as shown in FIG. 36 can be inserted into sockets 172 on the body side and also be easily removed again from the socket 172. This way the spline 170 can be replaced by another one when the flexible material 174 has just been removed and is not stretched across said spline 170. FIG. 37 depicts the configuration from FIG. 36 with a different spline 170'. The splines 170 and 180 here consist of a plug base, with which they can be inserted into the socket 172, and a shaping part. Said shaping part can also consist of shaping flat metal sheets or several rods that are connected with each other.

Many additional applications not shown here are feasible, such as for example as roll-over protective structures or crash zones that are moved out as a function of the vehicle speed and fenders or wheel wells that follow the steering movement of the front wheels. The decisive factor for being able to implement all these applications, however, is the availability of a suitable elastic material.

Figure 38:
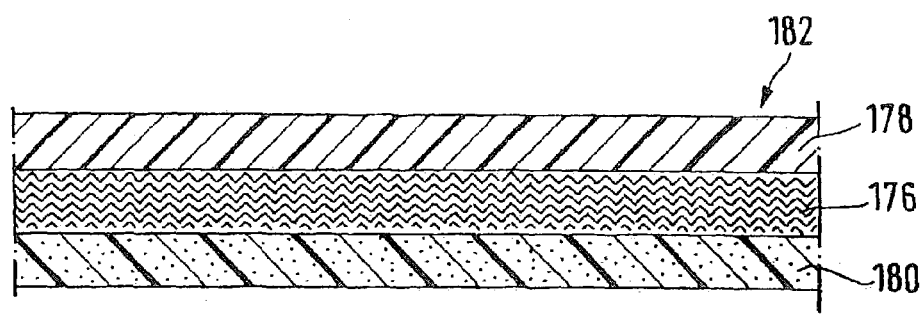
FIG. 38 is a sectional view through a material pursuant to the invention.

In FIG. 38, such an elastic material is shown, which consists of a center layer 176, which consists of a fabric made of PES fibers. The center layer 176 contains an upper and a lower coating 178 and 180. The upper coating 178 creates the desired appearance, which comes very close to that of a pained outer skin metal sheet of a vehicle body. The upper coating 178 is connected with the center layer 176 by means of an adhesive layer. The actual upper coating 178 consists of polyurethane foam, which guarantees the necessary water tightness, UV protection and other protection. To the top surface 182 of the upper coating 178 a thin aliphatic final layer is applied, which ensures the desired wear resistance and aging stability. The lower coating 180 has the same structure as the upper coating 178. However, to the lower coating 180 a magnetic power is admixed so that the elastic material securely rests against ferromagnetic components.

Figure 39:
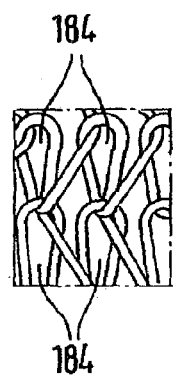
FIG. 39 is a basic depiction of a fabric in the material of FIG. 38.

As can be seen well in FIG. 39, the center layer 176 consists of a fabric with evenly arranged stitches 184. Such fabrics can be prepared without great efforts and short set-up times.

Figure 40:
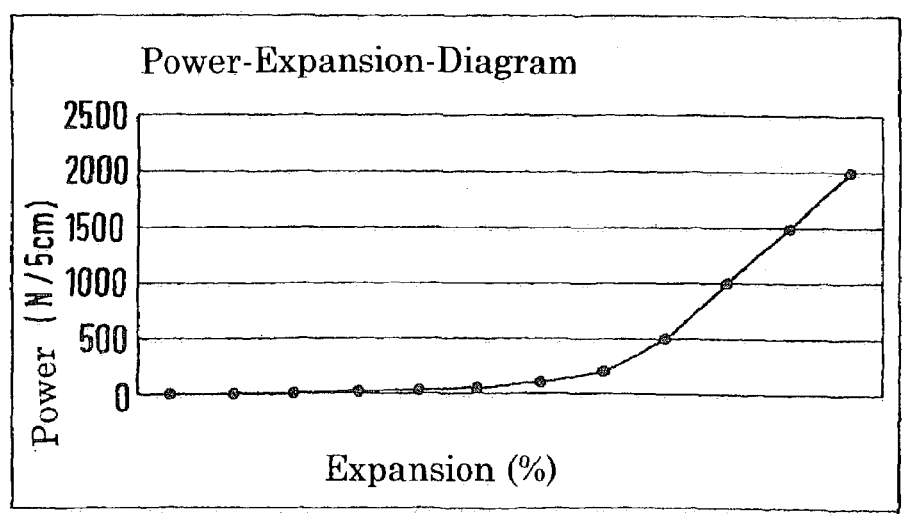
FIG. 40 is a power-expansion diagram of the material of FIG. 38.

Under load the elastic material behaves in accordance with the power-expansion diagram shown in FIG. 40. It illustrates well that the material can be expanded by almost 30% in the textile structure before the fibers expand. In order to achieve spring-back behavior possibly without hysteresis, the material was pre-stretched so that the material has set possibly already before its use. With such a material, firmness levels of up to 2000 N/5 cm can be reached with a thickness of about 1.7 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A non-roof section of a body of a vehicle comprising:
   a flexible material outer skin that is tensed at least over one part of a frame of the vehicle, has elastic properties, and is a flexible textile planar formation which is coated with a coating at least on a visible side, and
   at least one mechanically moveable adjusting element, provided beneath or on an edge of the outer skin, enabling the outer skin to be deformed by moving in a direction which increases tension in the outer skin.

2. The section according to claim 1, wherein the flexible material outer skin can absorb impact energy during an accident.

3. The section according to claim 1, wherein at least on one edge of the outer skin, a strip, which can be fastened to a component that is firmly attached to the body by a clip connection, is attached.

4. The section according to claim 3, wherein the strip is sewn onto the edge of the outer skin.

5. The section according to claim 3, wherein the strip is made of plastic.

6. The section according to claim 1, wherein the at least one adjusting element can be moved in a translatory manner, a rotary manner, or both translatory and rotary manners.

7. The section according to claim 1, wherein the section is a rocker panel of the vehicle which can be deformed by the at least one adjusting element in such a way that aerodynamics of the vehicle are improved while driving.

8. The section according to claim 7, wherein the at least one adjusting element is a pivotal adjusting element that is seated displaceably about an axis beneath the section, and wherein the axis runs essentially in the longitudinal direction of the vehicle.

9. The section according to claim 8, wherein the adjusting element contains different radial extensions around the axis.

10. The section according to claim 1, wherein the section forms a flap on the vehicle which can be opened or closed by the at least one adjusting element.

11. The section according to claim 10, wherein the section contains a slot which can be widened to create an opening.

12. The section according to claim 10, wherein the flap is formed by two sections which adjoin each other and can be moved apart on a joint so that an opening is created.

13. The section according to claim 12, wherein both sections can be connected to each other on the joint through a zipper.

14. The section according to claim 12, wherein both sections can be connected to each other on the joint through a clip connection.

15. The section according to claim 12, wherein, along edges of the sections, a rigid strip is attached to at least one of the sections, and wherein the rigid strip can be displaced by the at least one adjusting element.

16. The section according to claim 1, wherein the outer skin is the outer skin of a tailgate, and wherein it is possible to vary a length of said tailgate in the longitudinal direction of the vehicle if the rear window is shifted in the longitudinal direction by an adjusting element.

17. The section according to claim 1, wherein the section is a front or rear component of the vehicle which can be modified in its aerodynamic shape by at least one of said at least one mechanically moveable adjusting element which is a swiveling adjusting element.

18. The section according to claim 1, wherein the section is an underbody of the vehicle which can be lowered with the at least one adjusting element.

19. The section according to claim 1, wherein the section is a single-piece section that is a fender as well as an outside door panel of a door, and wherein the door presents the at least one adjusting element.

20. The section according to claim 1, wherein the section is an outside door panel, and wherein a height of an upper edge of an actual door body can be varied through the at least one adjusting element.

21. The section according to claim 1, wherein the section is a fender and a wheel well attached both to a chassis and the frame of the vehicle.

22. The section according to claim 1, wherein the outer skin forms a vehicle top which can be displaced through the at least one adjusting element by way of a rear edge in a longitudinal direction of the vehicle.

23. The section according to claim 1, wherein the outer skin can be deformed by the at least one adjusting element in such a way that, depending on a position of the at least one adjusting element, the outer skin covers at least one of a headlight and a radiator grill to a different degree or covers different partial areas of at least one of the headlight and the radiator grill.

24. The section according to claim 23, wherein the outer skin is one of at least two outer skin sections which cover the headlight or the radiator grill to a different degree or different partial areas of the headlight or of the radiator grill.

25. The section according to claim 1, wherein at least one lighting device is attached beneath the outer skin and at least partly shines through the outer skin.

26. The section according to claim 25, wherein the at least one lighting device is directly attached to the outer skin.

27. The section according to claim 1, wherein the at least one adjusting element is a plug element which can be plugged, in an easily detachable manner, into at least one socket that is firmly attached to the body of the vehicle and forms a part of the vehicle frame, across which an elastic section is stretched.

28. The section according to claim 1, wherein the textile planar formation is a knitted fabric or other fabric.

29. The section according to claim 1, wherein the coating offers ultraviolet protection.

30. The section according to claim 1, wherein the coating is waterproof.

31. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed by moving in a direction which increases tension in the outer skin,
wherein the at least one adjusting element is movable as a function of the vehicle speed.

32. The section according to claim 31, wherein, on a moveable section of a first adjusting element, a second adjusting element is located.

33. The section according to claim 31, wherein the adjusting element forms a spoiler, and wherein the adjusting element and a surrounding area on a body side are covered with the flexible material outer skin.

34. The section according to claim 33, wherein the spoiler and the surrounding area on the body side are designed such that, regardless of the position of the spoiler, no marginal sections of the spoiler become visible in the flexible material outer skin.

35. The section according to claim 33, wherein the flexible material outer skin is additionally stretched across at least one rod which is mounted to the spoiler on one end.

36. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the outer skin in a rear area of the vehicle can be deformed in such a way that it generates an aerodynamic negative lift similar to a rear spoiler.

37. The section according to claim 36, wherein the outer skin is made of an elastic material, and wherein the at least one adjusting element is seated eccentrically, has an elliptic cross-section, or both is seated eccentrically and has an elliptic cross-section and has the ability to deform the outer skin in the area of an end section of a tailgate in such a way that an aerodynamic negative lift is generated.

38. The section according to claim 36, wherein two swiveling adjusting elements are provided.

39. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the at least one adjusting element is movable as a function of the vehicle speed,
wherein the adjusting element forms a spoiler, and wherein the adjusting element and a surrounding area on a body side are covered with the flexible material outer skin,
wherein the spoiler and the surrounding area on the body side are designed such that, regardless of the position of the spoiler, no marginal sections of the spoiler become visible in the flexible material outer skin, and
wherein the surrounding area on the body side is a conventional tailgate with a recess for the spoiler.

40. The section according to claim 39, wherein the spoiler forms at least partly a rear edge of the tailgate.

41. The section according to claim 40, wherein a taillight is integrated in the spoiler and the flexible material outer skin is recessed in an area of the taillight.

42. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the at least one adjusting element is movable as a function of the vehicle speed,
wherein the adjusting element forms a spoiler, and wherein the adjusting element and a surrounding area on a body side are covered with the flexible material outer skin, and wherein the flexible material outer skin has a magnetic coating.

43. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the at least one adjusting element is movable as a function of the vehicle speed,
wherein the adjusting element forms a spoiler, and wherein the adjusting element and a surrounding area on a body side are covered with the flexible material outer skin,
wherein the flexible material outer skin is additionally stretched across at least one rod which is mounted to the spoiler on one end, and
wherein the at least one rod takes on a bent shape which, depending on a spoiler position, stretches the flexible material outer skin in a certain shape.

44. The section according to claim 43, wherein the at least one rod is arranged in an impression in the surrounding area on the body side when the spoiler is in a resting position.

45. The section according to claim 43, wherein the other end of the at least one rod is connected to a slide which can be displaced on the surrounding area on the body side.

46. The section according to claim 45, wherein the slide is located in an impression in the surrounding area on the body side.

47. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the at least one adjusting element is movable as a function of the vehicle speed,
wherein the adjusting element forms a spoiler, and wherein the adjusting element and a surrounding area on a body side are covered with the flexible material outer skin,
wherein the flexible material outer skin is additionally stretched across at least one rod which is mounted to the spoiler on one end, and
wherein the at least one rod, to the left and to the right, forms a lateral extension of a rear edge of the spoiler.

48. The section according to claim 47, characterized in that the at least one rod mounted to the spoiler is one piece.

49. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the at least one adjusting element is movable as a function of the vehicle speed,
wherein the adjusting element forms a spoiler, and wherein the adjusting element and a surrounding area on a body side are covered with the flexible material outer skin,
wherein the flexible material outer skin is additionally stretched across at least one rod which is mounted to the spoiler on one end, and
wherein the rod has a low-friction coating.

50. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed, wherein the textile planar formation includes polyethylene terephtalate or polyethylene naphthalate fibers,
wherein the textile planar formation also contains fibers that can also serve as actuators, sensors, or both actuators and sensors.

51. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the coating has an adhesive film, an aromatic intermediate layer, and an aliphatic final layer.

52. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the coating is magnetic.

53. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the coating looks similar to a painted sheet metal surface.

54. A section of a body of a vehicle comprising:
a flexible material outer skin that is tensed at least over one part of a frame of the vehicle, has elastic properties, and is a flexible textile planar formation which is coated with a coating at least on a visible side, and
at least one mechanically moveable adjusting element, provided beneath or on an edge of the outer skin, enabling the outer skin to be deformed,
wherein the flexible material outer skin is pre-stretched.

55. A process of changing a configuration of a section of a non-roof body of a vehicle having a flexible material outer skin that is tensed at least over one part of a frame of the vehicle, comprising mechanically moving at least one adjusting element provided beneath or on an edge of the outer skin in a direction which increases tension in the outer skin so as to deform the outer skin, wherein the flexible material outer skin has elastic properties, and is a flexible textile planar formation which is coated with a coating at least on a visible side.

* * * * *